United States Patent
Abu-Ageel

(10) Patent No.: US 7,475,992 B2
(45) Date of Patent: Jan. 13, 2009

(54) LIGHT RECYCLER AND COLOR DISPLAY SYSTEM INCLUDING SAME

(76) Inventor: Nayef M. Abu-Ageel, 45K Rolling Green Dr., Fall River, MA (US) 02720

( * ) Notice: Subject to any disclaimer, the term of this patent is extended or adjusted under 35 U.S.C. 154(b) by 699 days.

(21) Appl. No.: 11/067,591

(22) Filed: Feb. 25, 2005

(65) Prior Publication Data

US 2005/0225866 A1 Oct. 13, 2005

Related U.S. Application Data

(63) Continuation-in-part of application No. 10/458,390, filed on Jun. 10, 2003, now Pat. No. 7,306,344.

(60) Provisional application No. 60/548,814, filed on Feb. 27, 2004, provisional application No. 60/548,293, filed on Feb. 27, 2004, provisional application No. 60/548,619, filed on Feb. 27, 2004.

(51) Int. Cl.
*G03B 21/00* (2006.01)
*G03B 21/26* (2006.01)
*G03B 21/28* (2006.01)
*G02B 5/08* (2006.01)

(52) U.S. Cl. .............. 353/31; 353/37; 353/98; 359/838

(58) Field of Classification Search .......... 353/31, 353/34, 37, 84, 94, 98; 349/7, 8, 62, 68; 345/46, 82, 83; 348/742, 771, 801, 804; 385/146, 147, 43, 51; 235/455; 362/19; 359/495, 856; 358/475, 838

See application file for complete search history.

(56) References Cited

U.S. PATENT DOCUMENTS

| | | | | |
|---|---|---|---|---|
| 5,499,112 A | * | 3/1996 | Kawai et al. | 358/475 |
| 5,654,533 A | * | 8/1997 | Suzuki et al. | 235/455 |
| 6,224,216 B1 | * | 5/2001 | Parker et al. | 353/31 |
| 6,424,786 B1 | * | 7/2002 | Beeson et al. | 385/146 |
| 6,517,210 B2 | * | 2/2003 | Peterson et al. | 353/98 |
| 6,969,177 B2 | * | 11/2005 | Li et al. | 362/19 |
| 7,052,150 B2 | * | 5/2006 | Dewald | 359/856 |
| 7,301,701 B2 | * | 11/2007 | Abu-Ageel | 359/495 |
| 7,318,644 B2 | * | 1/2008 | Abu-Ageel | 353/20 |

FOREIGN PATENT DOCUMENTS

EP          1098536 A2      9/2001

* cited by examiner

*Primary Examiner*—Melissa Jan Koval
(74) *Attorney, Agent, or Firm*—Gavrilovich, Dodd & Lindsey LLP

(57) ABSTRACT

A light recycler for use in color projection display systems. The light recycler redirects light reflected by a color wheel of the projection system to increase the light output of the projection system. The light recycler is capable of setting the desired numerical aperture of the light source beam, as well as providing the desired spatial distribution of light in terms of intensity and angle. This improves the light uniformity and brightness of the image displayed by the projection system, and improves the efficiency of the system. The light recycler includes at least one substantially planar optical element array receiving the non-uniform light from the light source. The optical element array includes an optically transmissive substrate and a plurality of optical micro-elements formed in the substrate. The micro-elements act together to produce an output light beam having a desired cross-sectional area and spatial distribution of light intensity and angle.

17 Claims, 41 Drawing Sheets

US 7,475,992 B2

LIGHT RECYCLER AND COLOR DISPLAY SYSTEM INCLUDING SAME

RELATED APPLICATIONS

This application is a continuation-in-part of U.S. patent application Ser. No. 10/458,390 filed on Jun. 10, 2003 now U.S. Pat. No. 7,306,344, titled "Light Guide Array, Fabrication Methods, and Optical System Employing Same". This application also claims the benefit of U.S. Provisional Application Nos. 60/548,814, 60/548,293 and 60/548,619, all filed on Feb. 27, 2004. It is also related to U.S. patent application Ser. No. 11/066,616, titled "Compact Polarization Conversion System For Optical Displays" filed on Feb. 25, 2005 and U.S. patent application Ser. No. 11/066,605 titled "Compact Projection System Including A Light Guide Array", filed on Feb. 25, 2005. The subject matter of the aforementioned applications is hereby incorporated by reference as though set forth in full.

TECHNICAL FIELD

The present invention relates generally to color projection systems utilizing one or more light modulators, and more particularly, to a color projection system that includes means for recycling light reflected from a color wheel.

BACKGROUND

Single-modulator and two-modulator sequential color display systems have been used as a cost effective alternative to three-modulator full color display systems. Such systems are described in published European Patent Application EP1, 098,536 A2, to Duane Scott Dewald, which is hereby incorporated by reference.

As shown in FIG. 1, the brightness of the single-modulator 10 and two-modulator 25 sequential color display systems is improved through the use of a recycling solid light pipe 5 (or recycling light tunnel) coupled with a dynamic filter 7 and 14, which provides one or more segments of each primary color filter to the light beam at all times. As shown in FIGS. 1C-1E, the recycling pipe 5 consists of a light pipe 5b and a reflective plate 5a with an aperture 50a The exit aperture of the recycling pipe 5 typically has the same cross section aspect ratio as that of the modulator 9, 16 and 17 used by the display systems 10 and 25.

In FIGS. 1A-1B, the input light 3 and 13a is focused into the entrance aperture of a recycling pipe 5 through an aperture 50a in a reflective plate 5a. Light beams 6 and 13b exit recycling pipe 5 more uniform and homogeneous and impinge on the color wheels 7 and 14 (i.e., dynamic filter). Some of the light beam impinging on the color wheels 7 and 14 passes through each of the three or more color segments illuminated by the beam. Each segment transmits some of the incident light and reflects the remainder, which reenters the recycling pipe 5 and travels toward the reflective plate Sa. Some of this light impinges on the reflective plate 5a and gets reflected back toward the color wheels 7 and 14 and the rest of it passes through the aperture 50a toward the lamp reflector 2 and 12. Lens 8 focuses light transmitted by the color wheel 7 onto the spatial light modulator 9 as shown in FIG. 1A.

As shown in FIG. 1B, light beam 13c exiting the color wheel 14 enters a TIR (total internal reflection) prism assembly 15 which reflects the light beam to a color splitting prism assembly 18. As a result, modulator 17 is always completely illuminated by one primary color (e.g., red), while the other two primary colors (e.g., blue and green) scroll across modulator 16. The modulated light is focused by projection lens 19 onto a screen 20 to form an image.

Known single-modulator and two-modulator sequential color display systems suffer from low efficiency and lack of compactness. Therefore, there is a need for compact, light-weight, more efficient and cost-effective illumination systems to provide uniform light distribution over a certain area such as the active area of a modulator in sequential color display systems.

SUMMARY

It is an advantage of the present invention to provide a compact, light-weight, efficient and cost-effective color display system that utilizes an illumination system capable of producing a light beam of selected cross-section and selected spatial distribution in terms of intensity and angle. Such an illumination system enables color projection display systems with smaller modulators ($\leqq 0.5"$), leading to more compact and less expensive color projection systems.

A novel aspect of the present invention is the use of one or more optical element arrays to form an illumination system which is capable of recycling light reflected by a color wheel, setting the numerical aperture of the light source beam, as well as providing the desired spatial distribution of light in terms of intensity and angle.

In accordance with an exemplary embodiment of the invention, a light recycler, includes of a light guide, a reflective plate with aperture and at least one optical element array. The optical element array splits a light beam into a large number of sub-beams, which mix in a superimposing manner within the light guide, leading to a uniform light distribution across the exit aperture of the light guide. When used in a color projector system, the reflective plate of light recycler causes light reflected by the color wheel to be reflected back toward the color wheel (recycled), increasing the output brightness of the projector.

In accordance with another exemplary embodiment of the invention, a recycler includes circulation, extraction and collimating optical element arrays. This recycler provides greater efficiency and compactness due to the use of highly compact and efficient array components.

In accordance with a further exemplary embodiment of the invention, a recycler includes a single optical element array, thus, providing an even more compact illumination.

Other embodiments, features, aspects, advantages, systems and methods of the invention will be or will become apparent to one with skill in the art upon examination of the following drawings and detailed description. It is intended that all such additional embodiments, features and advantages be included within this description, be within the scope of the invention, and be protected by the accompanying claims.

BRIEF DESCRIPTION OF THE DRAWINGS

It is to be understood that the drawings are solely for purposes of illustration and not as a definition of the limits of the invention. Furthermore, it is to be understood that the drawings are not necessarily drawn to scale and that, unless otherwise stated, they are merely intended to conceptually illustrate the systems, structures and methods described herein. In the figures, like reference numerals designate corresponding parts throughout the different views.

DETAILED DESCRIPTION

Described herein are single-modulator and two-modulator sequential full color projection systems utilizing compact and efficient recyclers.

Figure 2A:
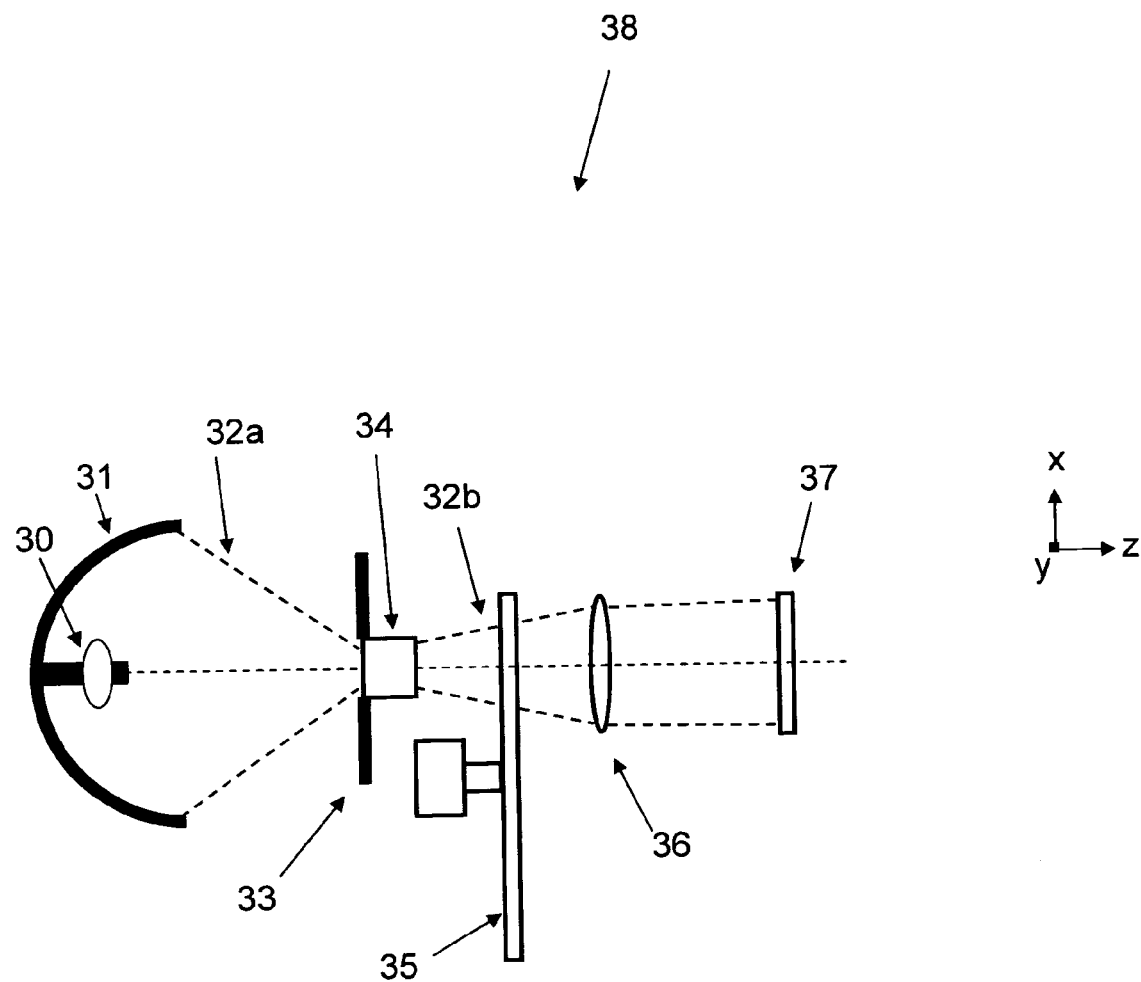
FIG. 2A shows a cross-sectional view of a single-modulator sequential full color projection system utilizing a compact recycler, in accordance with an exemplary embodiment of the present invention.

FIG. 2A shows a cross-sectional view of a single-modulator sequential color display system 38, which utilizes a compact light recycler 34, according to one embodiment of the present invention. The projection system 38 includes light source 30 housed in an elliptical mirror 31, reflective aperture 33, recycler 34, color wheel 35, focusing lens 36 and display panel (i.e. modulator) 37.

Figure 2B:
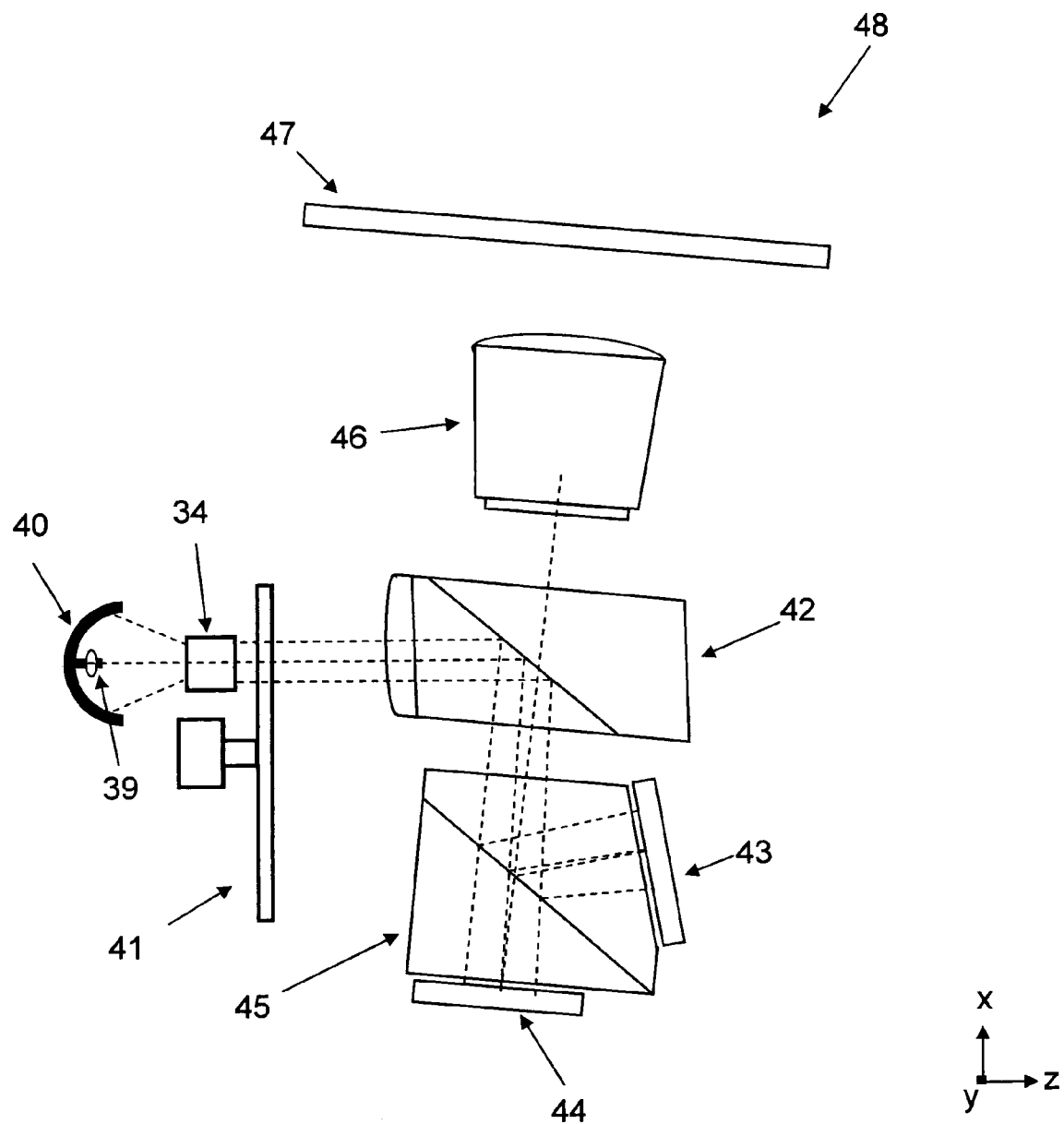
FIG. 2B shows a cross-sectional view of a two-modulator sequential full color projection system utilizing a compact recycler, in accordance with another exemplary embodiment of the present invention.

FIG. 2B shows a cross-sectional view of a two-modulator sequential color display system 48, which utilizes a compact light recycler 34 according to another embodiment of the invention. The projection system 48 includes light source 39 housed in an elliptical mirror 40, recycler 34, color wheel 41, TIR (total internal reflection) prism assembly 42, color splitting prism assembly 45, two modulators 43 and 44, projection lens 46 and screen 47.

Figure 1A:
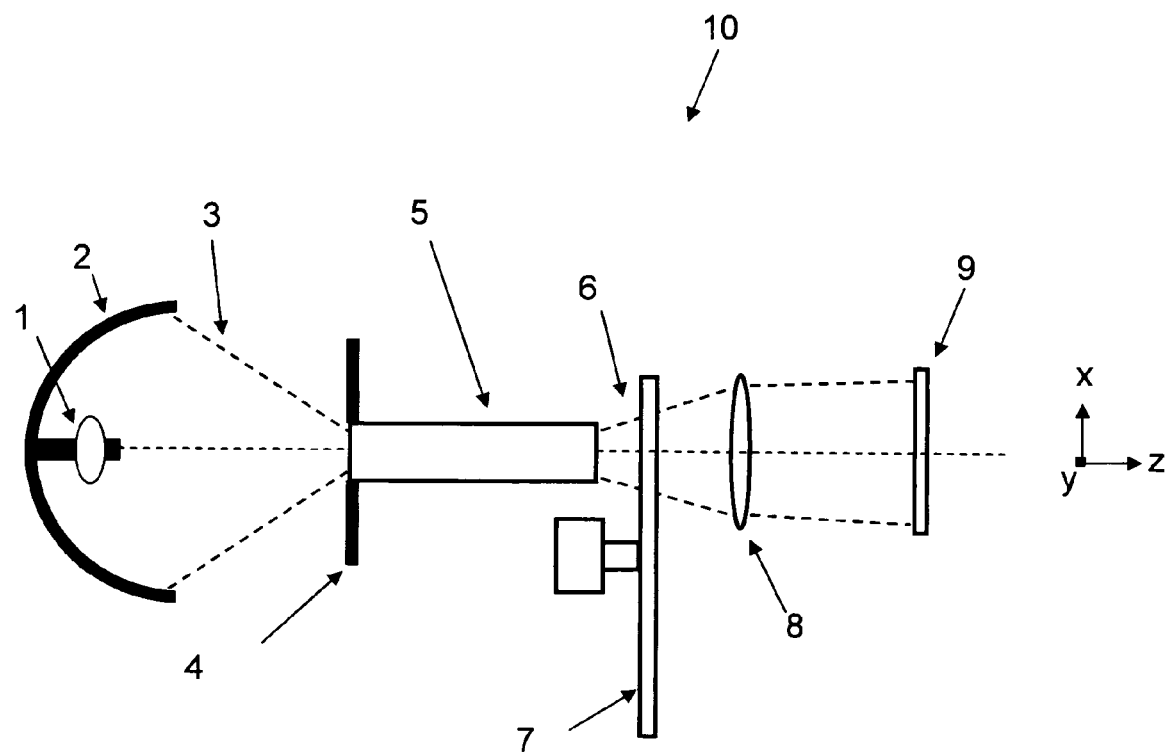
FIG. 1A shows a cross-sectional view of a prior art single-modulator sequential full color projection system, which utilizes a recycler to provide uniform light distribution.
Figure 1B:
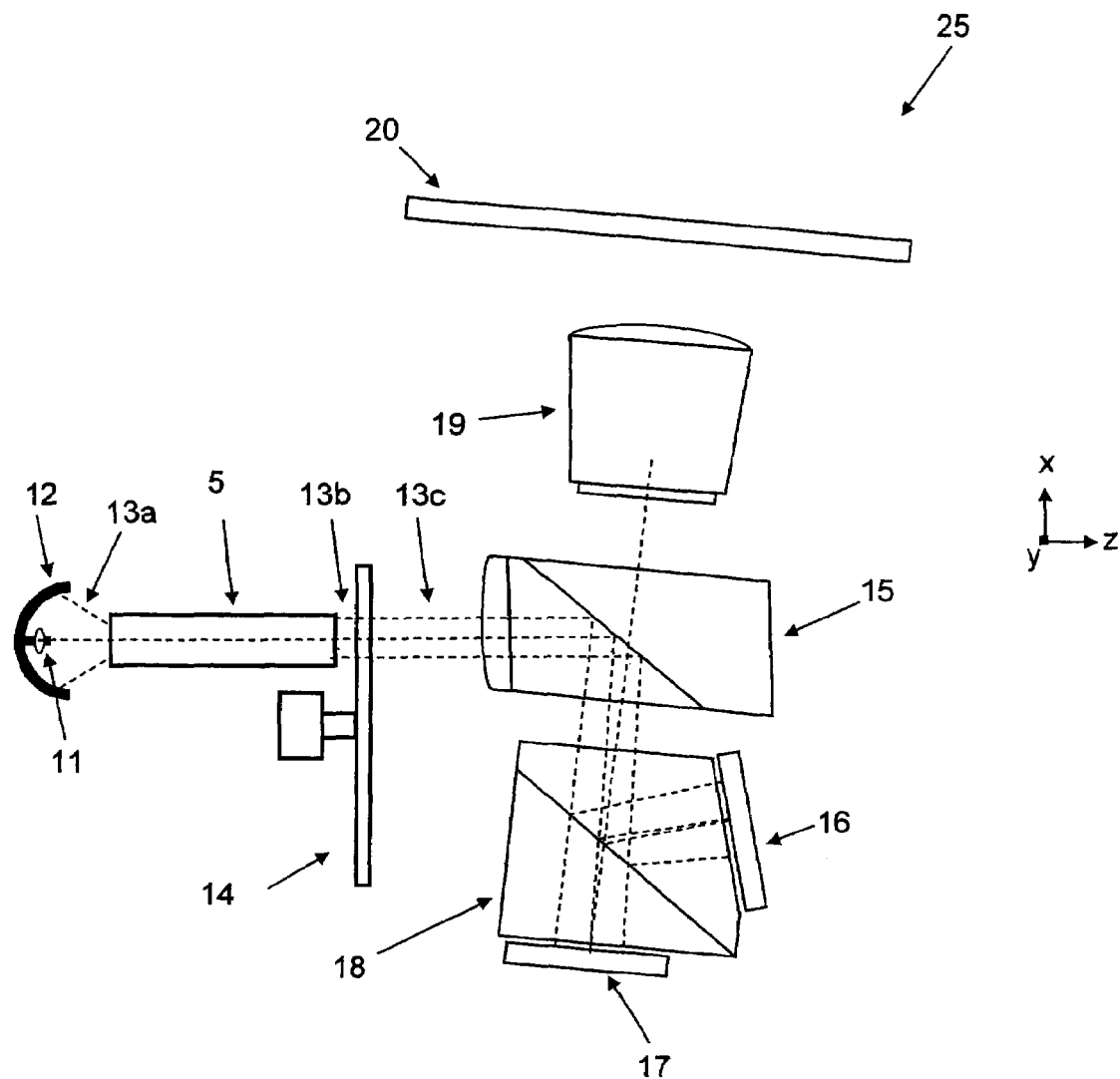
FIG. 1B shows a cross-sectional view of a prior art two-modulator sequential full color projection system, which utilizes a recycler to provide uniform light distribution.
Figure 1C:
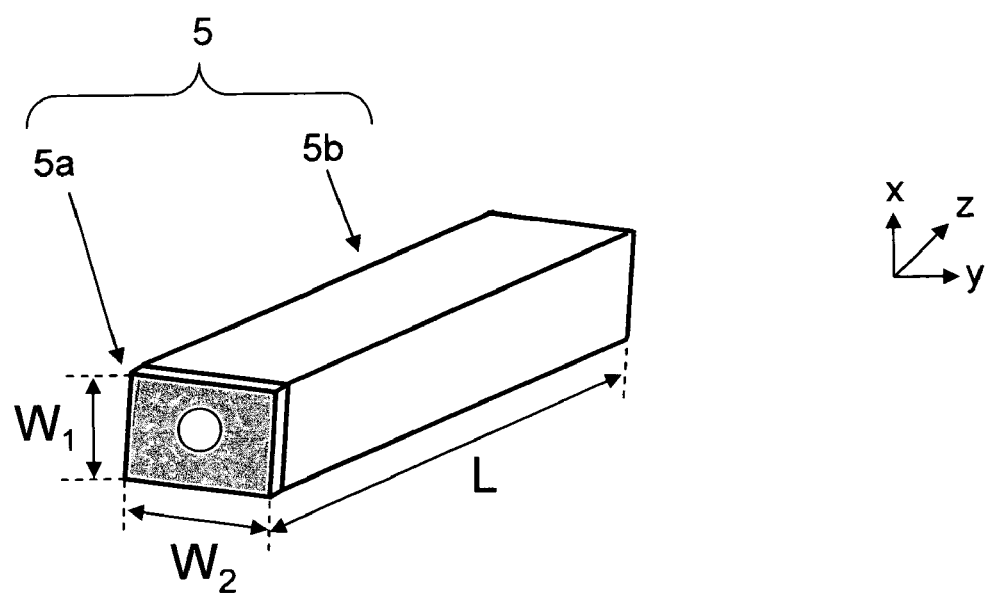
FIG. 1C shows a perspective view of a prior art recycler used in projection system of FIG. 1A.
Figure 1D:
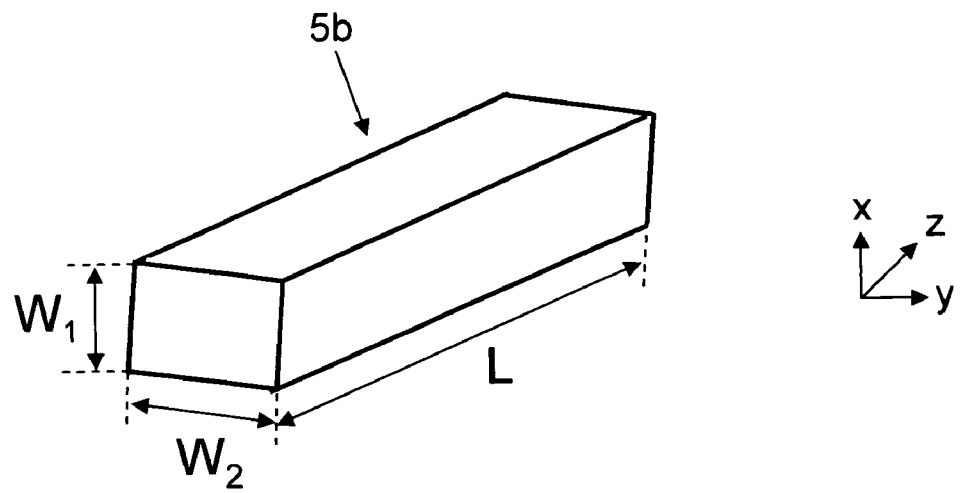
FIG. 1D shows a perspective view of a prior art light pipe or tunnel of FIG. 1C.
Figure 1E:
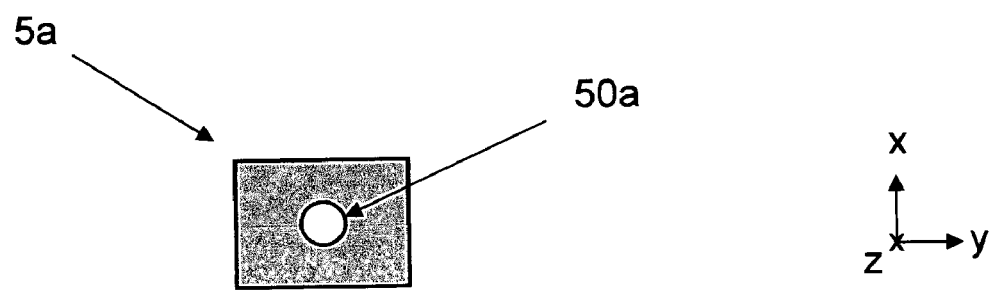
FIG. 1E shows a front plan view of a prior reflective aperture of FIG. 1C.

The single-modulator and two-modulator sequential full color projection systems 38 and 48 of FIGS. 2A and 2B are more efficient in terms of light utilization and provide more compactness when compared to known single-modulator and two-modulator sequential full color projection systems 10 and 25 of FIGS. 1A-1B. The higher efficiency and compactness are due to the use of recyclers 34 which are highly compact and more efficient. The recyclers' 34 higher efficiency enables the use of smaller modulators (modulator diagonal≦0.5") and smaller projection components such as the projection lens, which in turn leads to projection systems 38 and 48 that are more compact and less expensive.

Other light recyclers having alternative optical structures, such as recyclers 1130, 1160, 1770, 1950 and 1970 described herein below, can be substituted for recycler 34 in the projection systems 10, 25.

There are many variations of the recycler 34 and some of them are described in the various embodiments of this disclosure. The disclosed embodiments are examples only, illustrating the principles of the invention. The claimed invention extends to and covers other possible embodiments that are not fully described herein.

As used throughout the figures, the z-axis designates the primary optical axis of the light recyclers 34, 1130, 1160, 1770, 1950 and 1970, and their respective components.

Figure 2C:
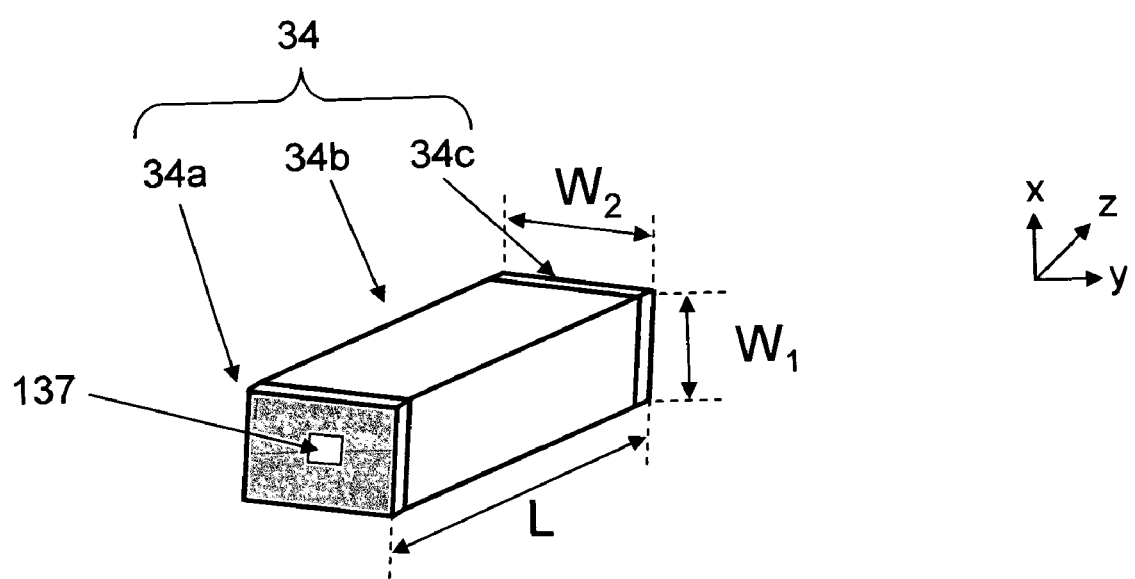
FIG. 2C shows a perspective view of a compact recycler used in the projection systems of FIGS. 2A-2B, in accordance with a further exemplary embodiment of the present invention.

According to one embodiment, FIG. 2C shows a recycler 34 consisting of a solid light pipe (or hollow light tunnel with reflective sidewalls) 34b, a reflective plate 34a with an aperture 137 and an optional optical element array 34c. The transmissive aperture 137 can be circular, rectangular, square, oval, hexagonal or any other shape. The ratio R of the area $A_1$ of aperture 137 to the area $A_2$ of the reflective plate 34a is defined as $R=A_1/A_2$. For example, $R=(d_1 \times d_2)/(W_1 \times W_2)$ for reflective plate 34a of FIG. 2D. The exit aperture of the recycling pipe 34b and the exit aperture of the optional optical element array 34c typically have the same cross section aspect ratio $W_1/W_2$ as that of the modulators 37, 43 and 44 used by the display systems 38 and 48.

Figure 2D:
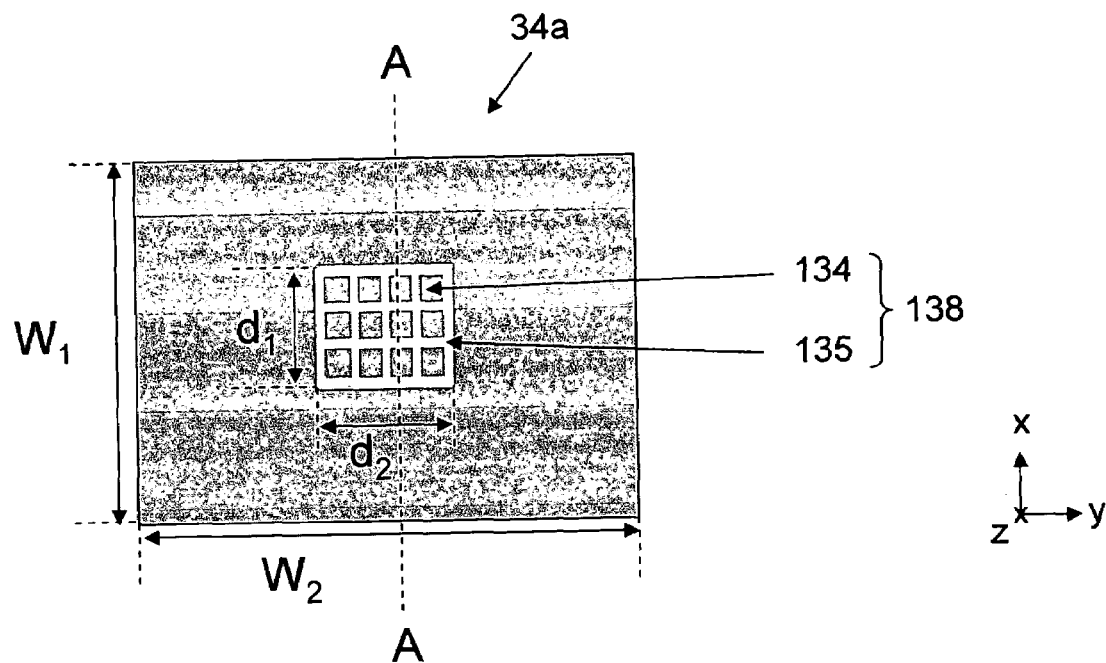
FIG. 2D shows a front plan view of an optical element array used at the entrance aperture of compact recycler of FIG. 2C.
Figure 2E:
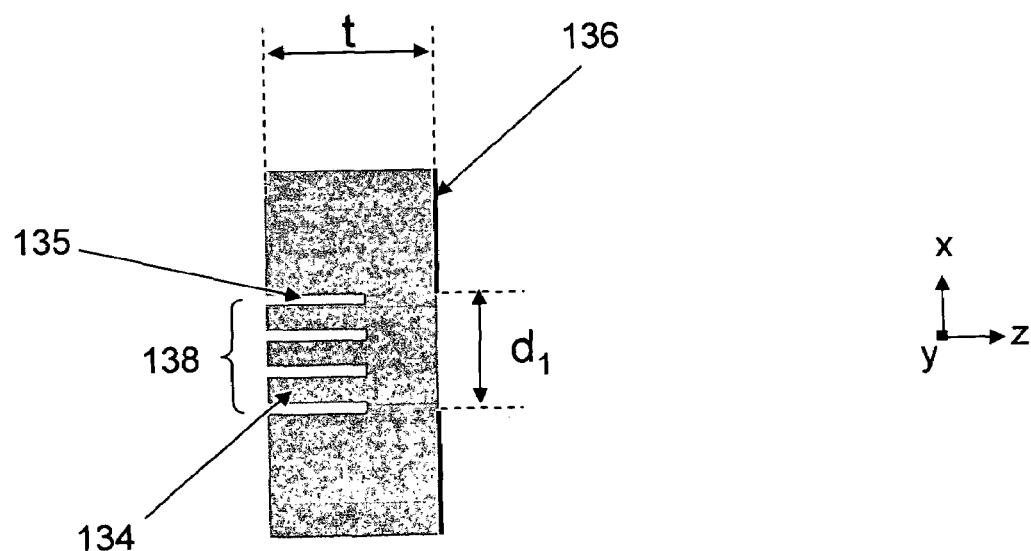
FIG. 2E shows a cross-sectional view of an optical element array of FIG. 2D.

According to another embodiment, reflective plate 34a is made as shown in FIGS. 2D-2E. FIG. 2D shows a front plan view of reflective plate 34a where an optical element array 138 with a cross section $d_1 \times d_2$ is formed on the surface of the entrance aperture 137. FIG. 2E shows a cross-sectional view of reflective plate 34a along line A of FIG. 2D. Neighboring optical elements 134 of optical element array 138 are separated by air or material 135 with lower index of refraction than that of the optical elements 134. Micro-guides 134 can be straight 134, tapered 144 and asymmetrical 154 as shown in FIG. 2I, FIG. 2J and FIG. 2K, respectively, and their density can be up to several millions per cm². Design parameters of each optical element include size ($C_1$, $C_2$, $C_3$, and $C_4$) and shape of cross-section, degree of taper, length, as well as angles $\theta_1$, $\theta_2$, $\theta_3$, and $\theta_4$. Design parameters of an optical element array include distribution of optical elements 134 within an optical element array 138, which can be one dimensional, two dimensional, random, uniform or non-uniform. In addition to optical elements, other types of micro-elements such as micro-lenses and micro-prisms or combinations of different types can be fabricated within a single array. A reflective layer 136 is bonded or deposited on the backside of reflective plate 34a except for the entrance aperture 137 as shown in FIG. 2E.

Figure 2F:
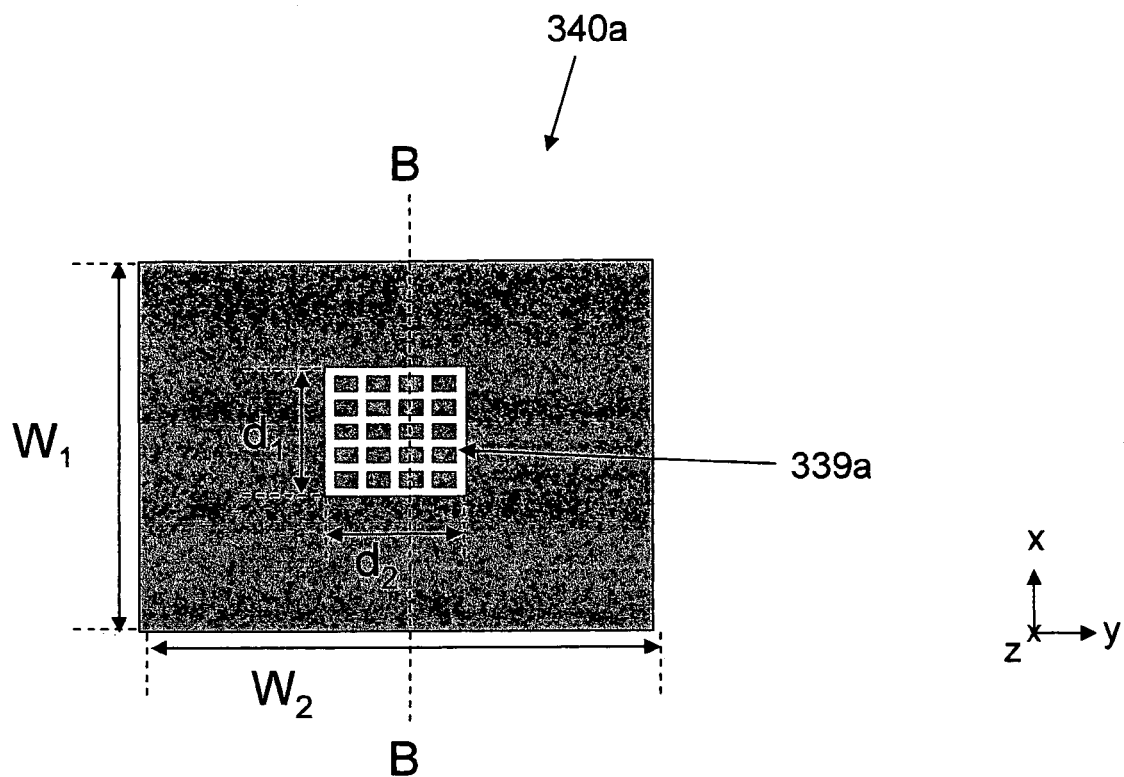
FIG. 2F shows a front plan view of another optical element array that can be used at the entrance aperture of compact recycler of FIG. 2C.
Figure 2G:
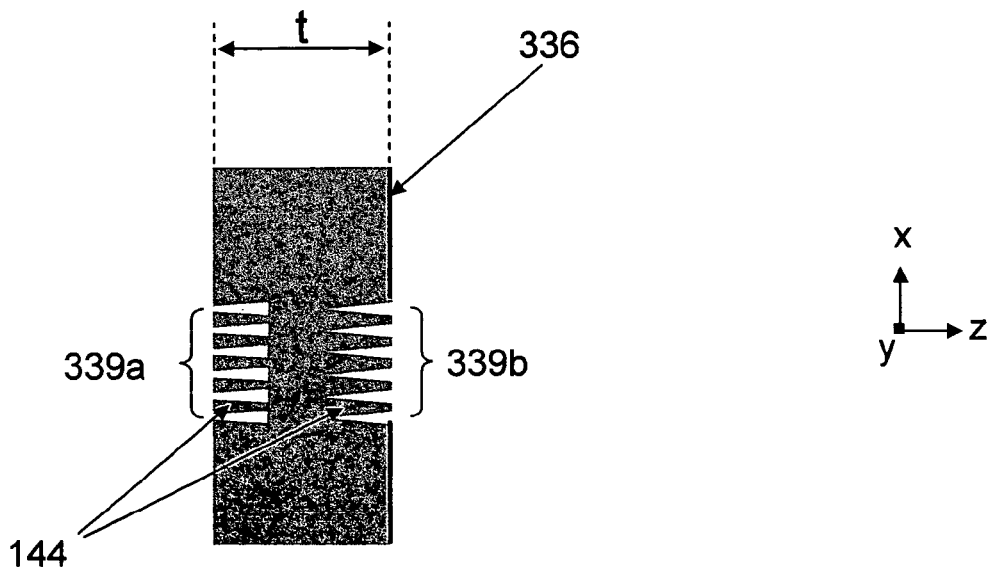
FIG. 2G shows cross-sectional view of an optical element array of FIG. 2F using non-collimating tapered optical elements.
Figure 2H:
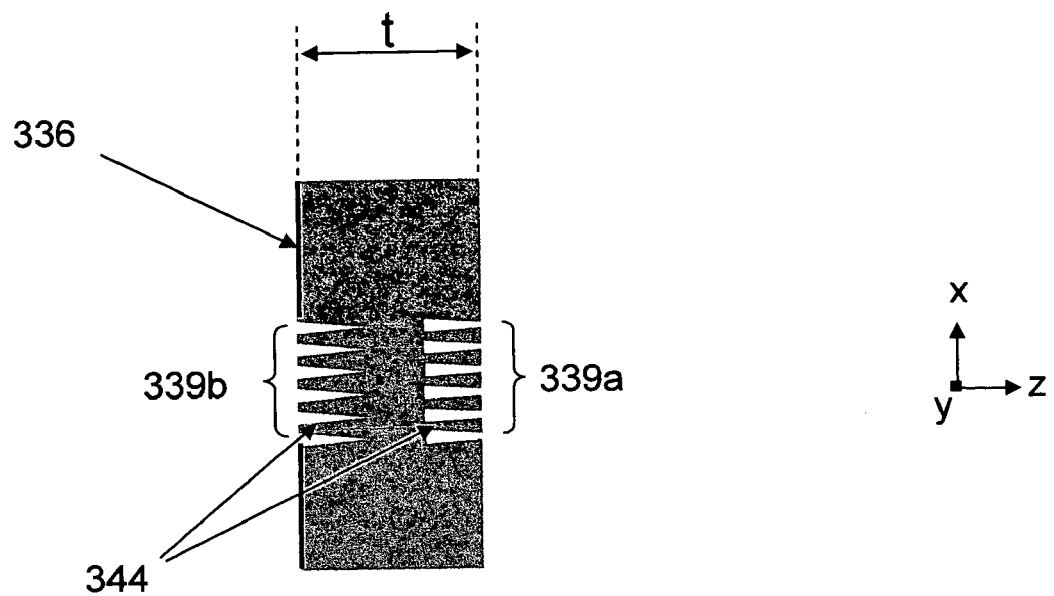
FIG. 2H shows cross-sectional view of an optical element array of FIG. 2F using collimating tapered optical elements.
Figure 2I:
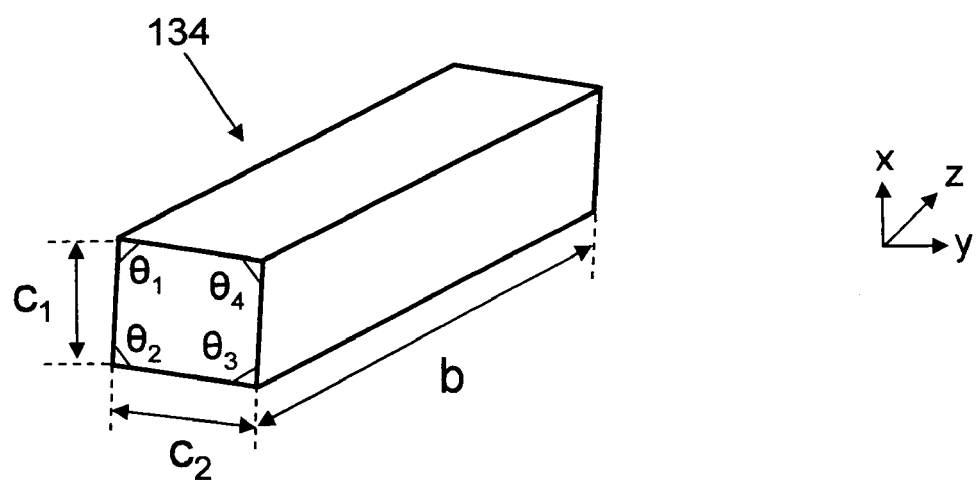
FIG. 2I shows perspective view of a straight optical element.
Figure 2J:
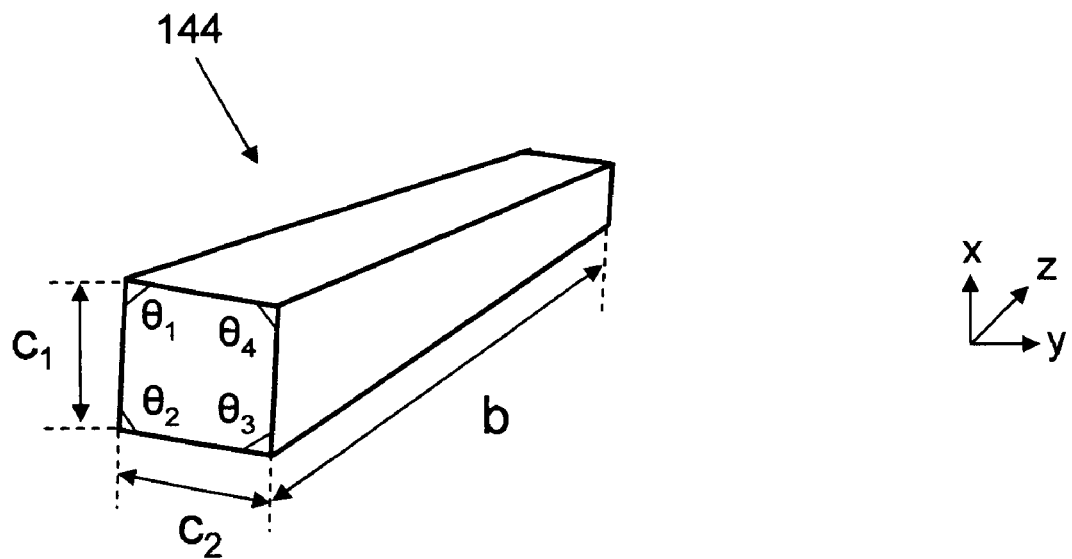
FIG. 2J shows perspective view of a tapered optical element.
Figure 2K:
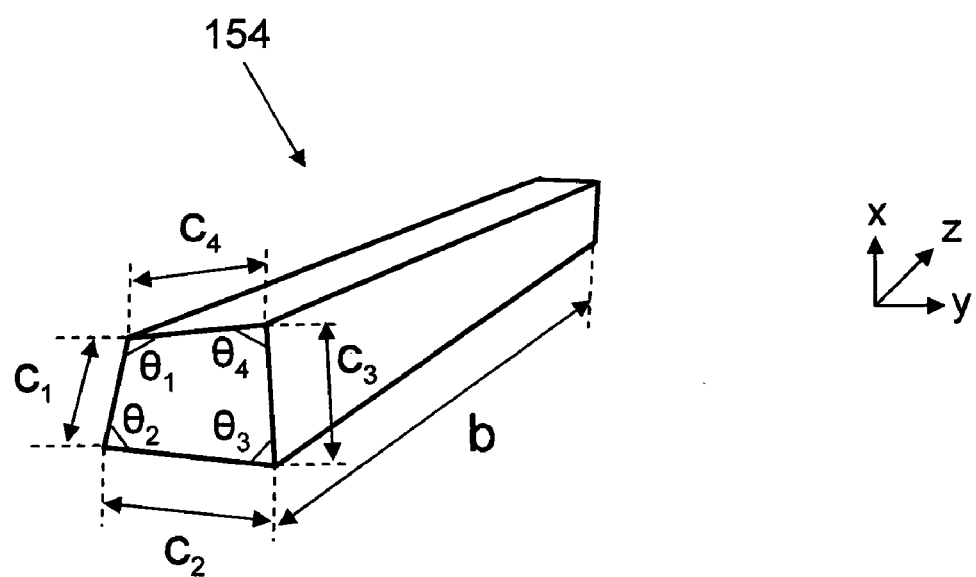
FIG. 2K shows perspective view of asymmetrical optical element.

FIGS. 2F-2H show another form of a reflective plate 34a. FIG. 2F shows a front plan view of a reflective plate 340a and FIG. 2G shows a cross-sectional view of FIG. 2F along line B. Two optical element arrays 339a and 339b are formed on the front and back sides of the entrance aperture of reflective plate 340a. A reflective layer 336 is deposited on or bonded to one side of array 340a excluding arrays 339a and 339b. Reflective plate 340a can be bonded to light pipe 34b so that array 339b faces the light pipe/tunnel 34b and array 339a faces the light source (FIG. 2G). In this case, optical element arrays 339a and 339b deliver a light beam with an increased cone angle to light pipe/tunnel 34b thus enhancing the light mixing within the light pipe/tunnel and providing high light uniformity at a reduced pipe/tunnel 34b length. On the other hand, it is possible to glue or bond reflective plate 340a to light guide 34b so that array 339a faces the light pipe/tunnel 34b and array 339b faces the light source (FIG. 2H). This arrangement decreases the cone angle of the received light beam and delivers more collimated light to the next stage.

Figure 2L:
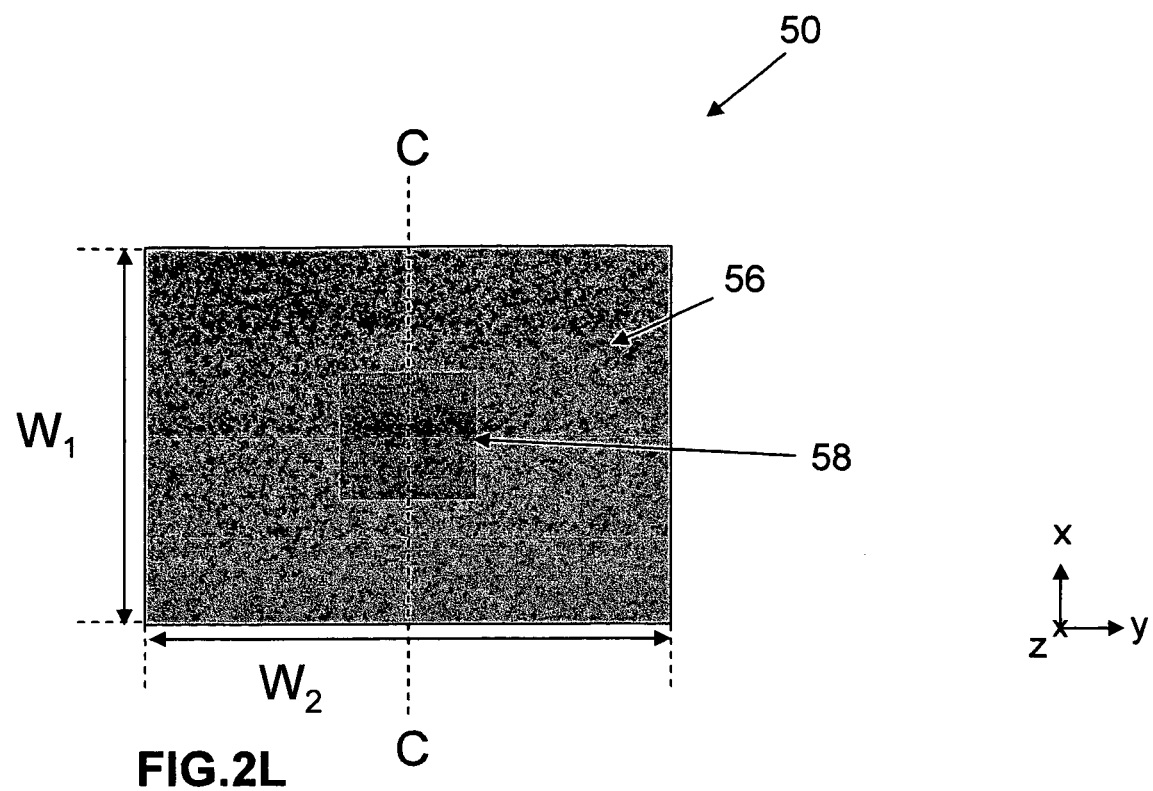
FIG. 2L shows a front plan view of a reflective plate with an optical element array bonded to its solid aperture.
Figure 2M:
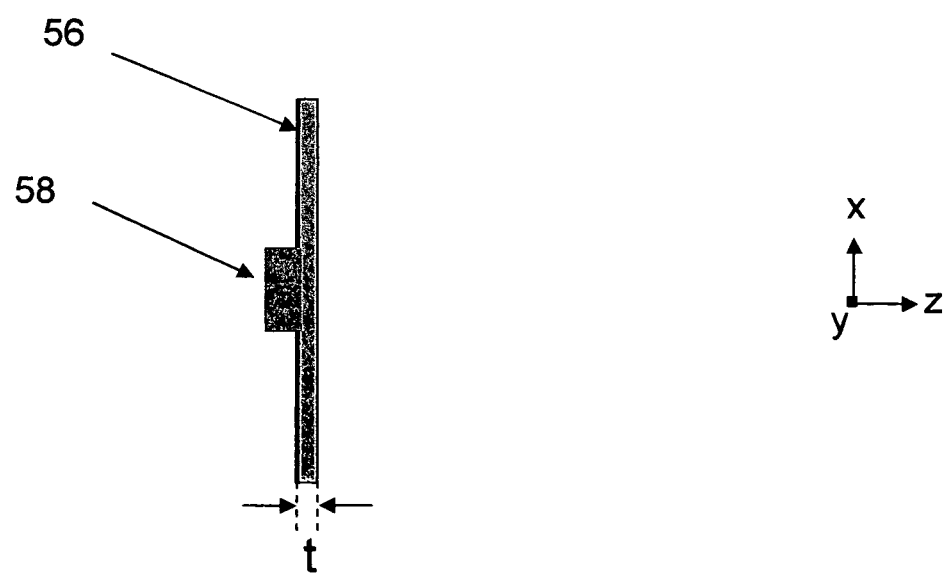
FIG. 2M shows a cross-sectional view of a reflective plate of FIG. 2L.
Figure 2N:
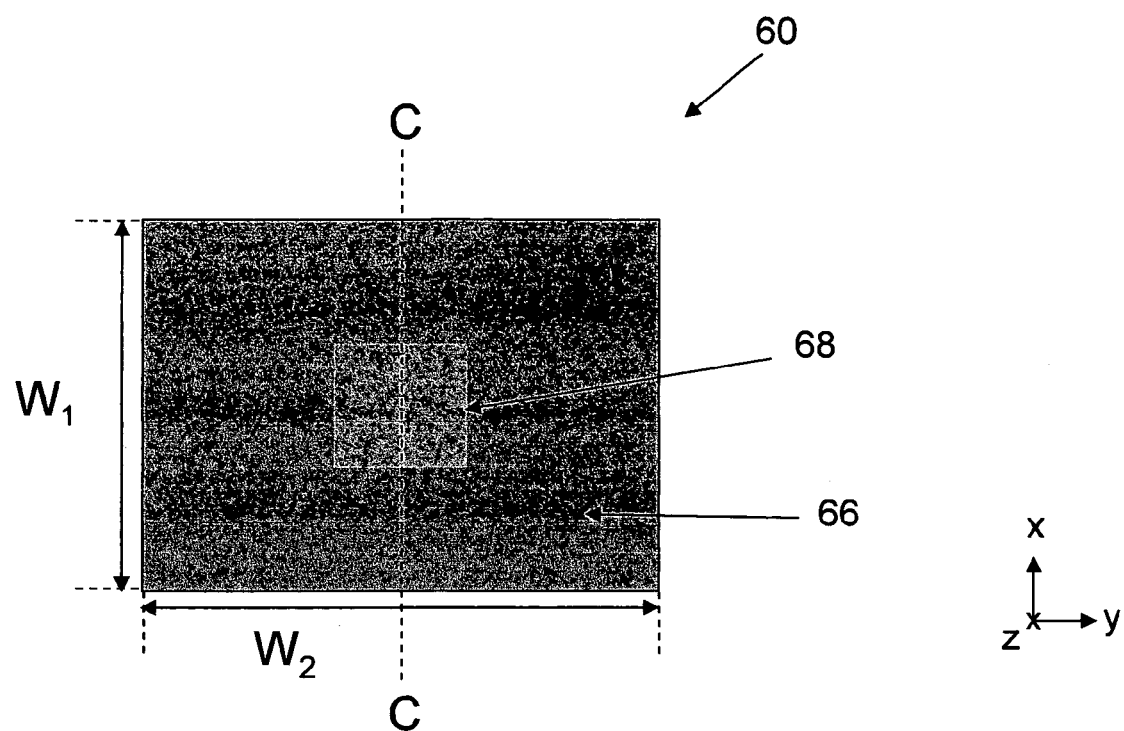
FIG. 2N shows a front plan view of another reflective plate with an optical element array bonded to its hollow aperture.
Figure 2O:
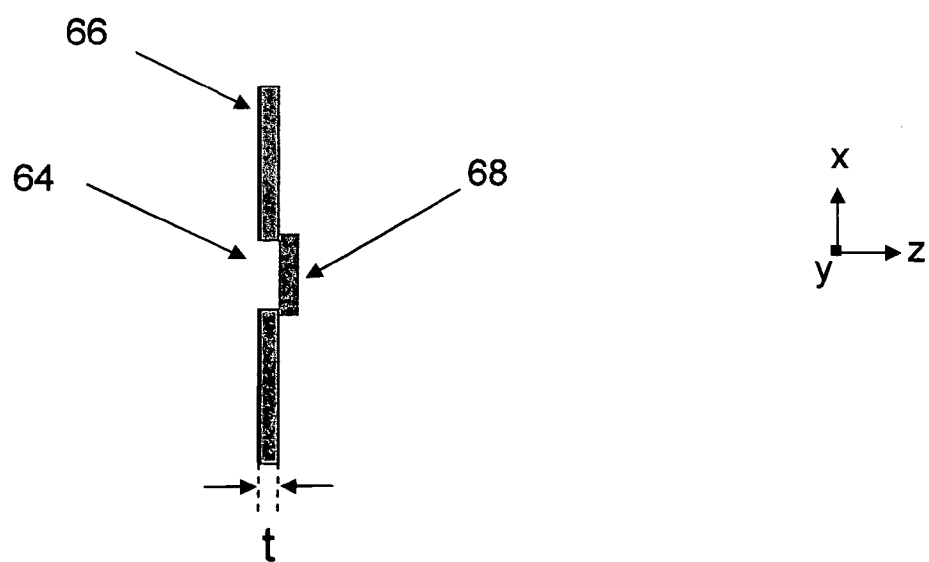
FIG. 2O shows a cross-sectional view of a reflective plate of FIG. 2N.

According to another embodiment, FIGS. 2L-2O show an alternative approach to making reflective plate 34a. FIG. 2L shows a front plan view of a reflective plate 50. FIG. 2M shows a cross-sectional view of FIG. 2L along line C. In this case, optical element array 58 is bonded to a solid aperture in the reflective layer 56 of plate 50 rather than being an integral part of plate 50. FIGS. 2N and 2O show a front plan view and a cross-sectional view along line C of a reflective plate 60, respectively. In this case, optical element array 68 is bonded to a hollow aperture 64 in the reflective plate 60 rather than being an integral part of plate 60. As shown in FIGS. 2L-2O, reflective layers 56 and 66 are applied to plates 50 and 60, respectively. This approach permits independent fabrications of reflective plates 50 and 60 and optical element arrays 58 and 68, which in turn leads to making more optical element arrays 58 and 68 out of a certain plate or substrate, thus, lowering the cost of the optical element arrays 58 and 68 and recycler 34.

Figure 2P:
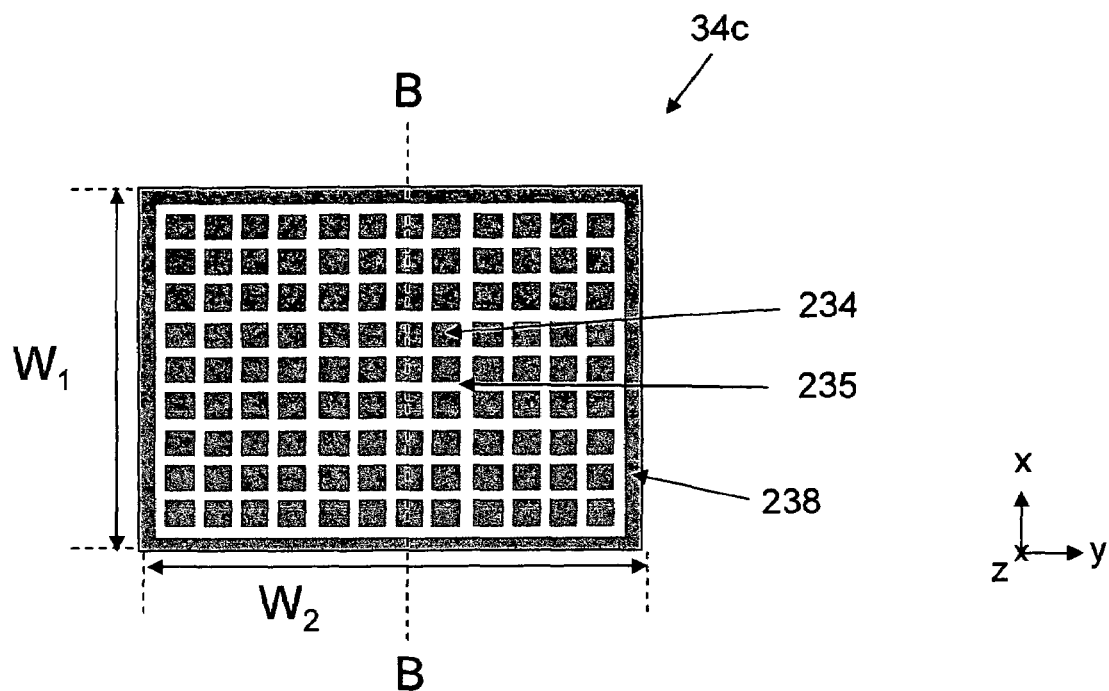
FIG. 2P shows a front plan view of an optical element array used at the exit aperture of compact recycler of FIG. 2C.
Figure 2Q:
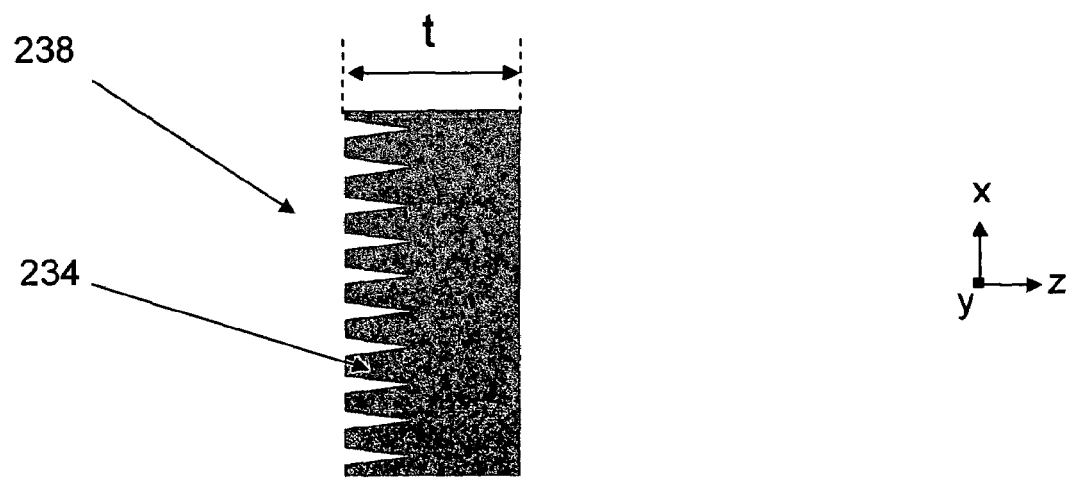
FIG. 2Q shows a cross-sectional view of an optical element array of FIG. 2P.
Figure 2R:
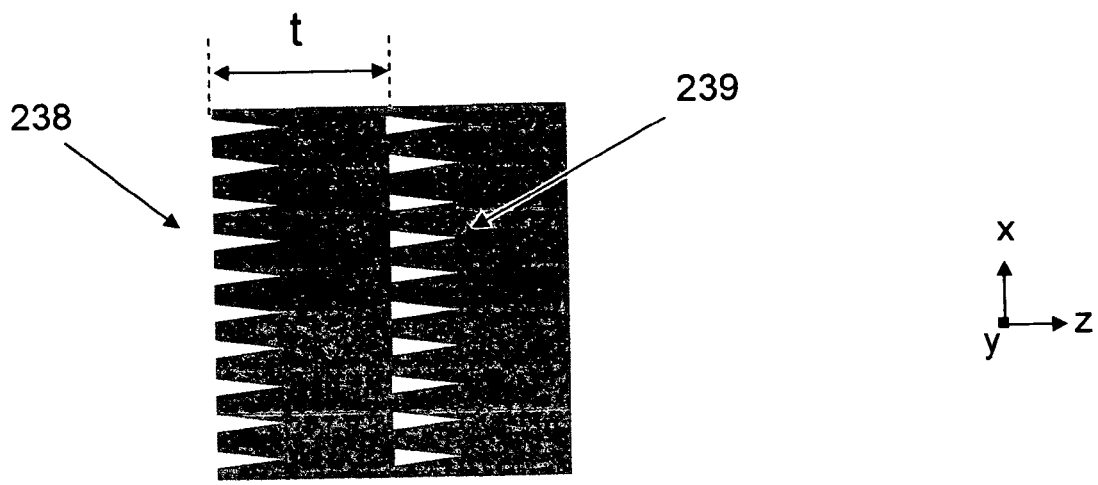
FIG. 2R shows a cross-sectional view of two optical element arrays bonded together.
Figure 2S:
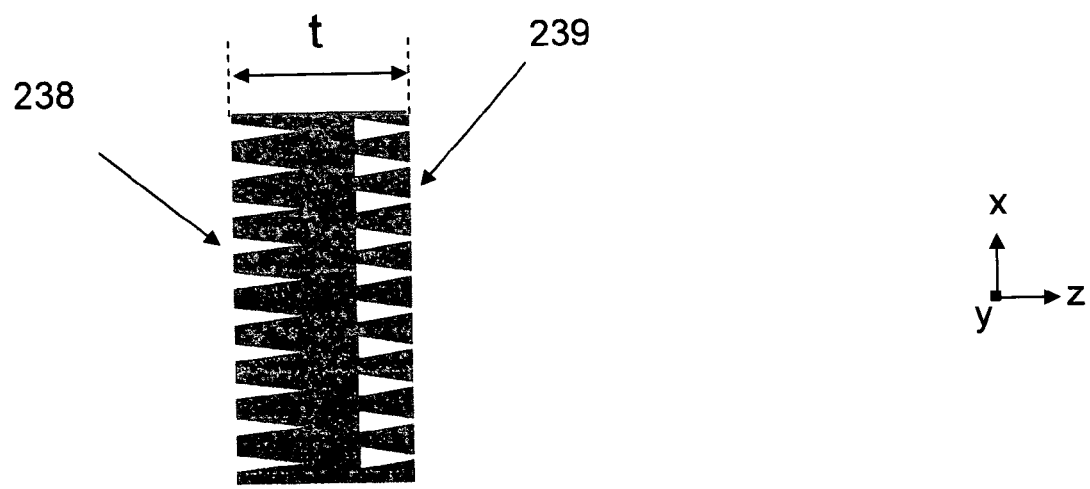
FIG. 2S shows a cross-sectional view of an optical element array of FIG. 2P with collimating optical elements on both sides of the array.

According to one embodiment, optional optical element array 34c is shown in FIGS. 2P-2S. FIG. 2P shows a front plan view of optical element array 34c and FIG. 2Q shows a cross-sectional view of FIG. 2P along line B. Micro-guide array 34c may consist of tapered optical elements 234 arranged in a two-dimensional array 238 on one side of the substrate as shown in FIG. 2Q. The area 235 between adjacent optical elements 234 can be air or a material with an index of refraction lower than that of optical elements 234. As shown in FIG. 2R, two (or more) identical optical element arrays 238 and 239 can be arranged in tandem to perform the function of optical element array 34c. Micro-guide arrays 238 and 239 can be different in terms of their design and can be fabricated on both sides of a single substrate as shown in FIG. 2S. In this case, optical element array 34c receives light from light pipe/tunnel 34b and delivers a more collimated light beam to the next stage.

The operation of recycler 34 is explained as follows. As shown in FIG. 2A, the input light 32a emitted from a light source 30 such as an arc lamp is focused into the entrance aperture 137 (FIG. 2C) of recycler 34 through an aperture in a reflective plate 33. Micro-guide array 138 (FIG. 2D), which is located at the entrance aperture 137, receives the input light, splits input light beam into a large number of sub-beams with selected cone angles and delivers them to the light pipe/tunnel 34b. By splitting the light beam and increasing the cone angle of the sub-beams, required light uniformity can be achieved with shorter light pipe/tunnel 34b leading to a more compact recycler 34. It is also possible to use a collimating optical element array at the entrance aperture 137, which delivers a light beam with a smaller cone angle to the light pipe/tunnel 34b. This leads to a higher degree of light coupling between the light source 30 combined with its reflector 31 and the display panel 37 at the expense of achieving the required light uniformity with a longer light pipe/tunnel 34b. A light beam with the required uniformity is delivered to the optional optical element array 34c, which in turn delivers a light beam with a lower cone angle when compared to the cone angle of light received from the light pipe/tunnel 34b. In addition, optical element array 34c can be used to deliver light with a selected spatial distribution of cone angle to the next stage by controlling the design of the individual optical elements within optical element array 34c. It is possible to have a recycler 34 with a single optical element array 34a and light pipe/tunnel 34b (i.e. without optical element array 34c at the exit aperture). The light beam 32b exits recycler 34 and impinges on the color wheel 35. The color wheel 35 transmits part of the light 32b and reflects the rest of light beam 32b back to the recycler 34. The reflected light travels toward the reflective plate 34a of the recycler 34 where part of it escapes toward lamp/reflector 30 and 31 through aperture 137 and the remainder gets reflected back toward the color wheel 35 by a reflective layer 136 and 336. Light escaping to the lamp/reflector 30 and 31 may have a chance of being refocused back into the entrance aperture 137. As the ratio R of reflective plate 34a is increased, more light enters from the light source into the light pipe/tunnel 34b and more of the light reflected by the color wheel 35 escapes toward the lamp/reflector 30 and 31. Therefore, a balance between the area of aperture 137 and reflective area of the reflective plate 34a is required to obtain the optimum efficiency. Light transmitted by the color wheel 35 is imaged onto a display panel 37 (i.e. spatial light modulator) using lens 36. The light beam which passes through the display panel 37 is focused by a field lens (not shown) into the aperture of a projection lens (not shown in FIG. 2A), which in turn projects the image displayed on the display panel 37 onto a screen (not shown in FIG. 2A). The exit aperture of recycler 34 is preferably positioned very close to the color wheel 35 so that light reflected by the color wheel enters the exit aperture of recycler 34.

The operation of projection system 48 of FIG. 2B is described as follows. The input light is focused into the entrance aperture of a recycler 34 through an aperture 137 in a reflective plate 34a (FIG. 2C). The input light beam exits recycler 34 more uniform and homogeneous and impinges on the color wheel 41. Some of the light beam passes through each of the three or more color segments of the color wheel and the remainder is reflected back toward the recycler 34. Part of the reflected light impinges on the reflective plate 34a and gets reflected back toward the color wheel 41 and the rest of it passes through the aperture 137 toward the lamp/reflector 39 and 40. Light beam exiting the color wheel 41 enters a TIR prism assembly 42 which reflects the light beam to a color splitting prism assembly 45. As a result, modulator 44 is always completely illuminated by one primary color (e.g. red), while the other two primary colors (e.g. blue and green) scroll across modulator 43. The modulated light is focused by projection lens 46 onto a screen 47 to form an image.

The recycler 34 of this disclosure (FIG. 2) has six key advantages over known light recyclers 5 (FIG. 1). First, the recycler 34 of this disclosure can use a larger reflective plate 34a while maintaining the etendue of the lamp/reflector. This leads to increasing the efficiency of the recycler 34 and display systems 38 and 48 either by increasing the size of the aperture 137 while maintaining the ratio R (i.e. increasing collection efficiency from light source/reflector while maintaining the recycling efficiency of light reflected by the color wheel) or by maintaining the size of the aperture 137 while decreasing the ratio R (i.e. maintaining collection efficiency from light source/reflector while increasing the recycling efficiency of light reflected by the color wheel). Second, higher coupling efficiency between the light source and the light valve (i.e. modulator) can be provided by the use of collimating optical element arrays 34c and/or 34a within the recycler 34, which results in a more efficient use of light by the light valve, thus, reducing the required number of light sources and/or their power. In this case, collimating optical element arrays 34c and/or 34a do not increase the etendue of light beam delivered to the light valve thus enhancing coupling efficiency and increasing display brightness. Third, the recycler 34 of this disclosure provides higher level of light uniformity when compared to that of known recyclers 5 at an equivalent length. This high uniformity is due to the large number of additional virtual sources formed by optical element array 34a. Images of these virtual sources are superimposed on top of each other forming an extremely uniform light distribution at the exit aperture of the recycler 34. Fourth, the recycler 34 of this disclosure provides control over the spatial distribution of light in terms of its cone angle. This is done through the design of the individual optical elements of array 34c. Fifth, the recycler 34 of this disclosure provides a superior level of compactness and light-weight. The length of the recycler 34 can be lower than the length of known recyclers 5 by up to three orders of magnitude resulting in very compact light-weight illumination systems. In addition, the high coupling efficiency enables the use of small size display panels ($\leq 0.5"$) which results in using smaller optical components such as the projection lens, thus, leading to very compact projection systems. Sixth, lower cost is achieved by using the optical element arrays of this disclosure due to the reduced size of the optical components used within the projection system. As the size of optical components is reduced, their cost is reduced and the cost of the overall system is reduced.

Figure 3A:
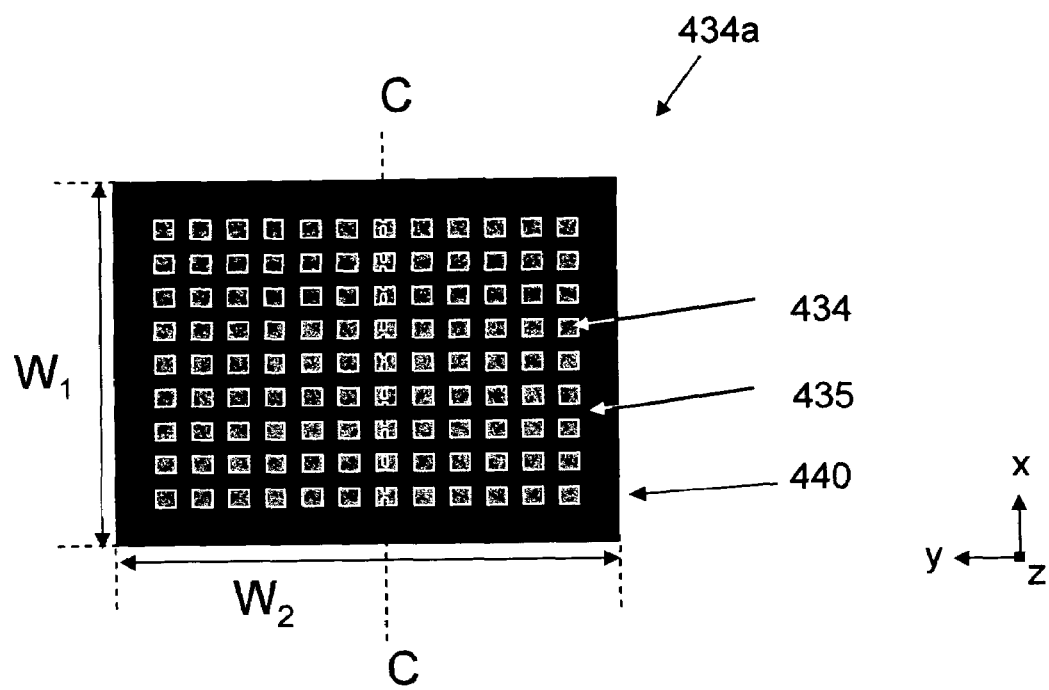
FIG. 3A shows a front plan view of a solid optical element array that can be used at the entrance aperture of compact recycler of FIG. 2C.
Figure 3B:
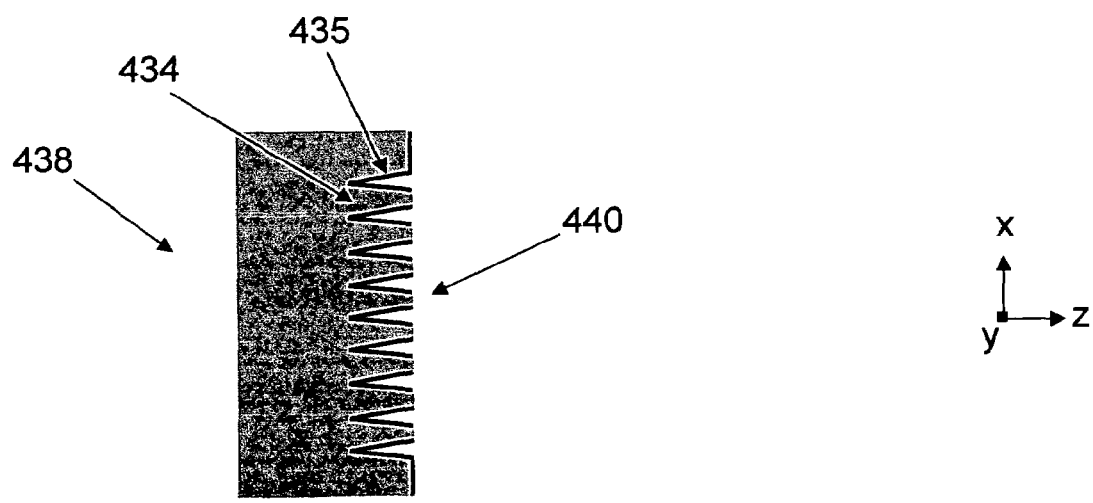
FIG. 3B shows a cross-sectional view of an optical element array of FIG. 3A.
Figure 3C:
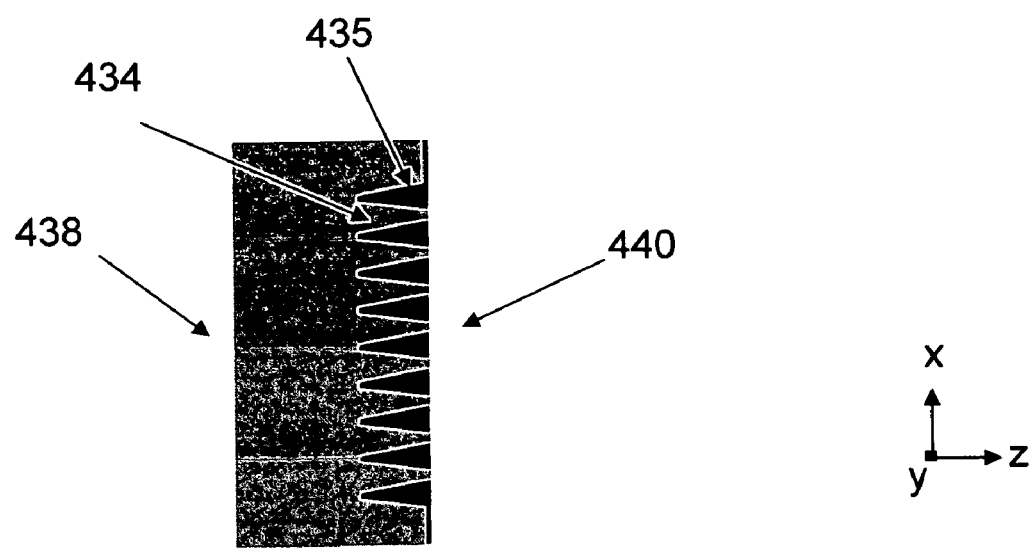
FIG. 3C shows a cross-sectional view of an optical element array of FIG. 3A with a flat reflective layer.
Figure 3D:
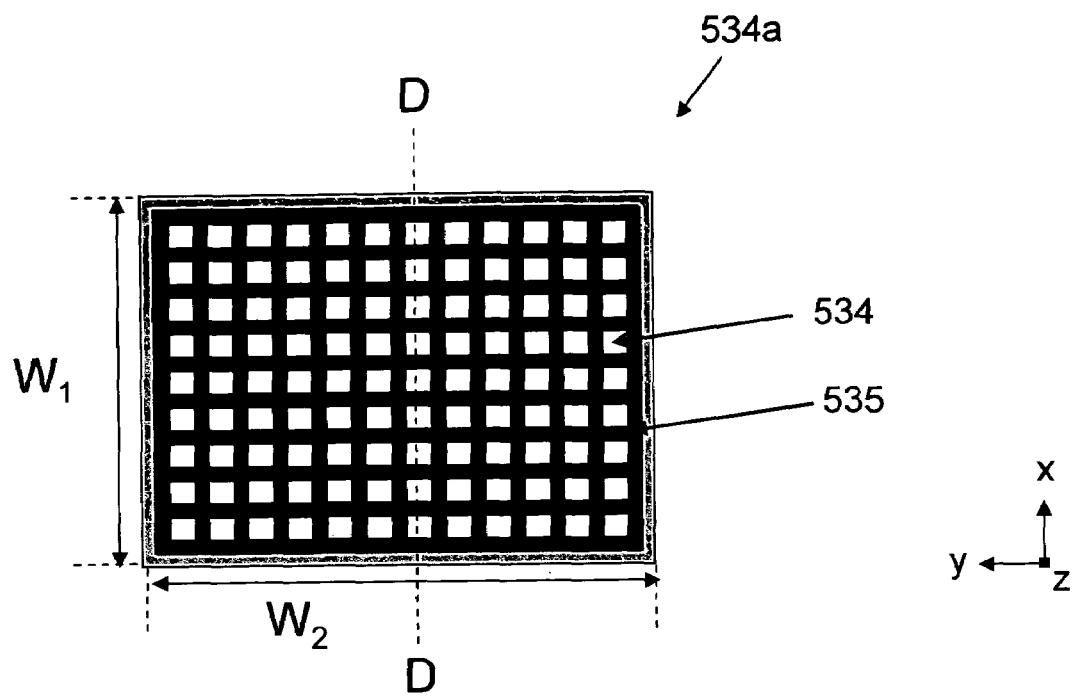
FIG. 3D shows a front plan view of a hollow optical element array that can be used at the entrance aperture of compact recycler of FIG. 2C.
Figure 3E:
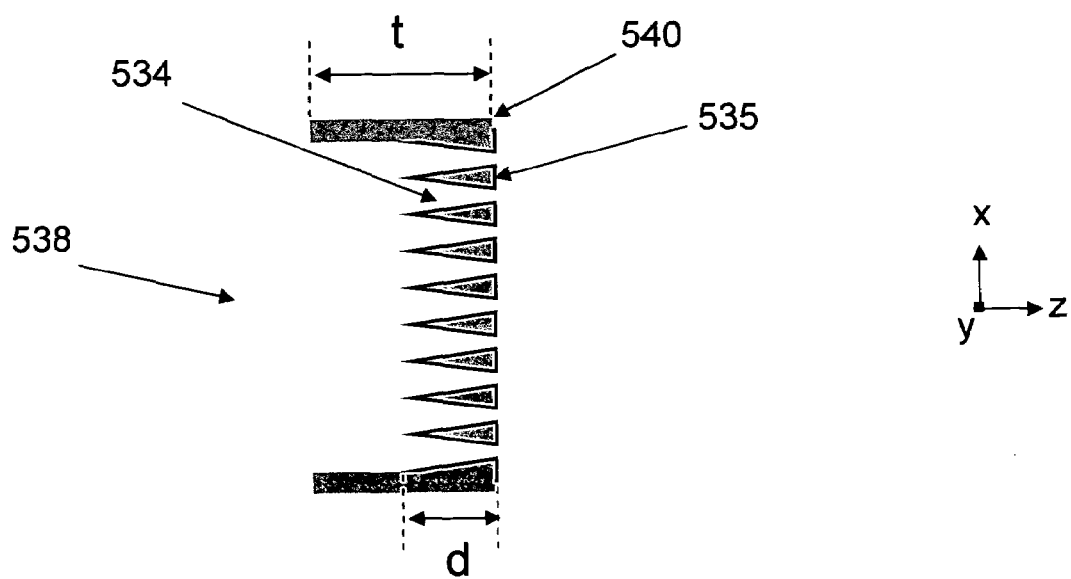
FIG. 3E shows a cross-sectional view of an optical element array of FIG. 3D using shallow micro-tunnels.
Figure 3F:
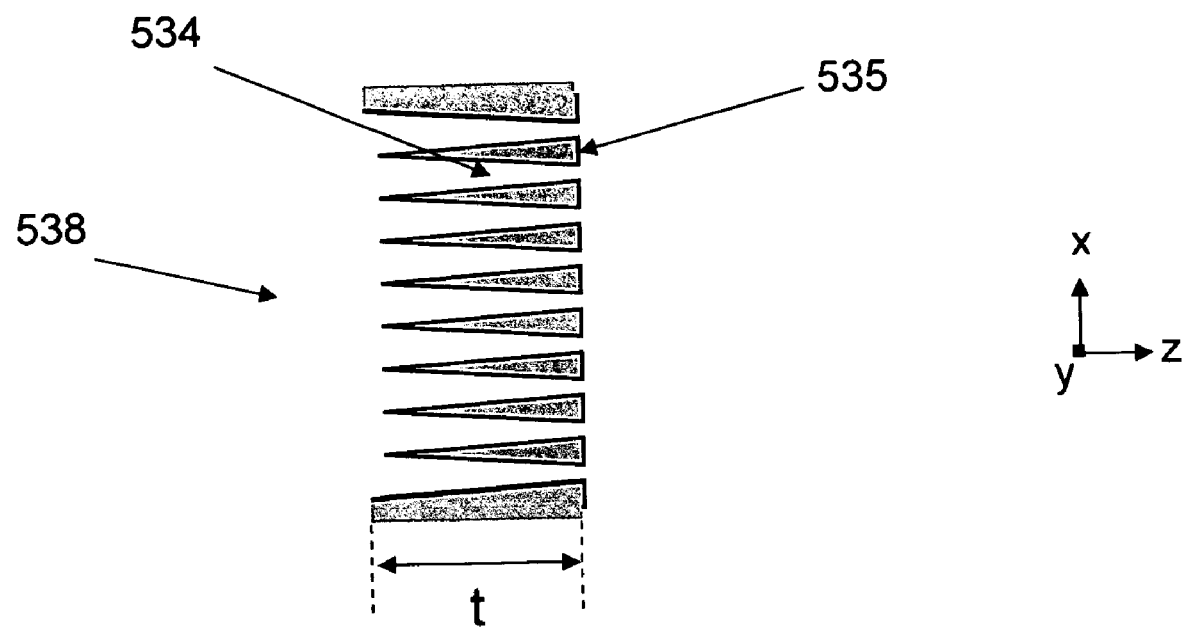
FIG. 3F shows a cross-sectional view of an optical element array of FIG. 3D using deep micro-tunnels.

FIGS. 3A-3C show a more effective reflective plate 434a according to another embodiment of the invention. FIG. 3A shows a front plan view of reflective plate 434a, which has optical elements 434 arranged over the full surface of reflective plate 434a in a two dimensional optical element array 440. FIGS. 3B and 3C show cross-sectional views of FIG. 3A along line C. As shown in FIG. 3B, reflective layer 435 is deposited over the sidewalls of optical elements 434. In FIG. 3C, areas between sidewalls of optical elements 434 are filled with reflective layer 435. A polishing step may be needed after the deposition of reflective layer 435 to obtain fillings with flat surface as shown in FIG. 3C. Since input light beam enters plate 434a from the left and initially through side 438, most of this light exits optical element array 440 with a higher cone angle, enters light pipe/tunnel and travels toward the color wheel (FIGS. 2A-2B). On the other hand, part of light traveling from right to left (i.e. light reflected by the color wheel) is reflected back toward the color wheel by reflective layer 435 and the remainder passes through the uncoated part of optical element array 440 toward the lamp/reflector (FIGS. 2A-2B). FIGS. 3D-3F show a reflective plate 534a that is similar to reflective plate 434a of FIGS. 3A-3C except for the use of micro-tunnels 534 rather than solid optical elements 434 to alter the cone angle of received light. FIG. 3D shows a front plan view of reflective plate 534a and FIGS. 3E-3F show cross-sectional views of FIG. 3D along line D. The depth d of micro-tunnels 534 of FIG. 3E is smaller than the substrate thickness t whereas micro-tunnels 534 of FIG. 3F have their depth extending across the substrate thickness t. The reflective layer 535 coats the sidewalls of micro-tunnels 534 as well as the area between them.

Reflective plates 434a and 534a of FIGS. 3A-3F have an additional advantage over reflective plates 34a, 340a, 50 and 60 of FIGS. 2D-2O. Reflective plates 434a and 534a allow the use of larger light sources, which are typically cheaper and provide more light flux. By using the whole surface of the reflective plate 434a and 534a as an input aperture rather than using a small portion of it, larger light sources can be used and more light can be collected even when using smaller light sources. In this case, most or all of light received by reflective plates 434a and 534a from the light source is delivered to the next stage (i.e., light pipe/tunnel 34b) with a higher cone angle and a small fraction of this light is reflected back toward the light source. On the other hand, a substantial amount of the light traveling in the opposite direction (i.e., light reflected by color wheel toward the reflective plate) is reflected back toward the color wheel by the reflective coating 435 and 535. In order to maintain lamp/reflector etendue, a collimating optical element array 34c is usually used at the exit aperture of the light pipe/tunnel 34b. In reflective plates 34a, 340a, 50 and 60, light is focused into the entrance aperture 137 (FIG. 2C), which forms a small portion of the surface area of reflective plate 34a, 340a, 50 and 60, thus, collecting less light from the light source. In order to collect more light without increasing the etendue, smaller light sources such as lamps with small arc gaps (1 mm or lower) are usually used in the recyclers of known art.

Figure 4A:
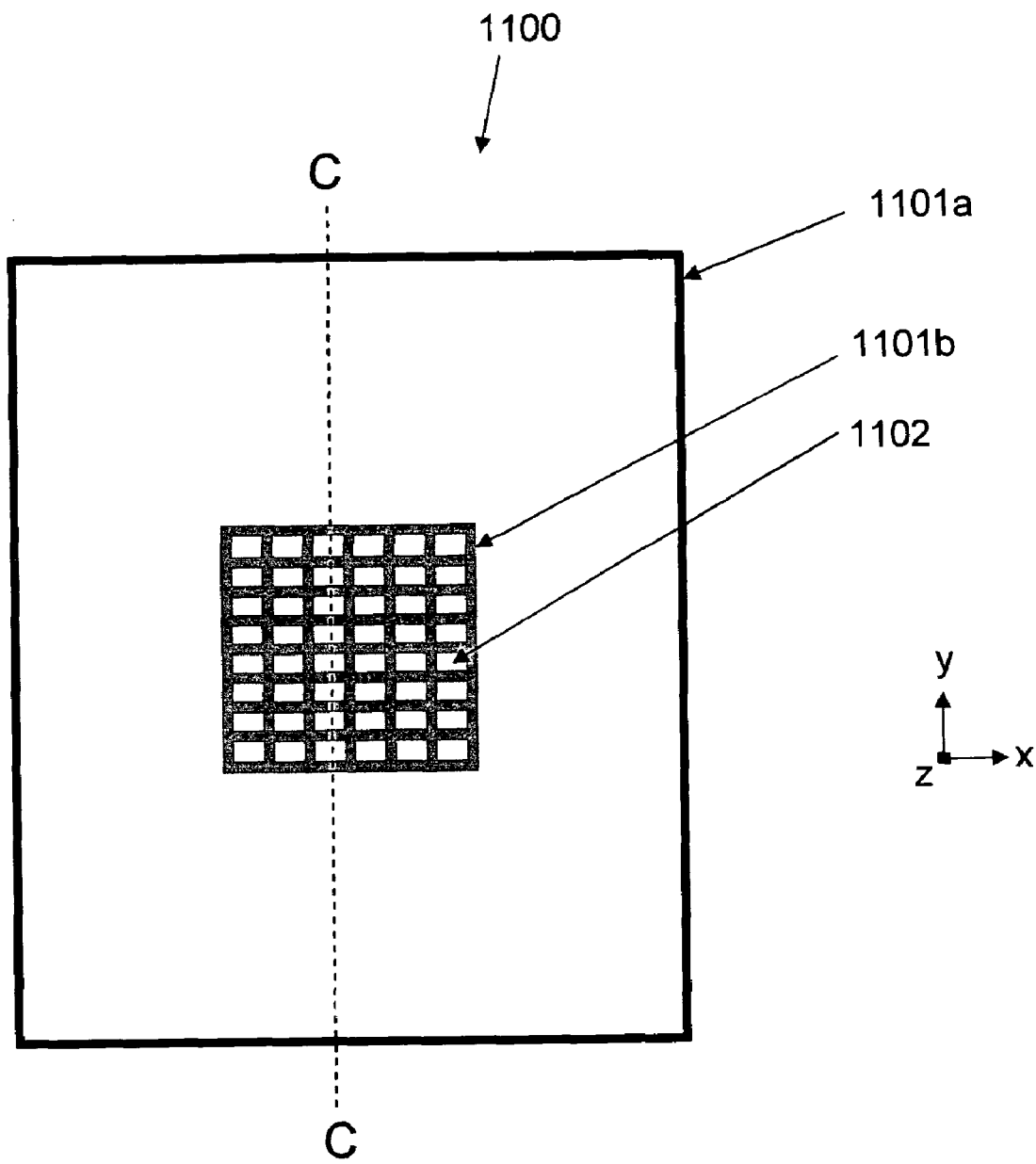
FIG. 4A shows a front plan view of a circulation array.
Figure 4B:
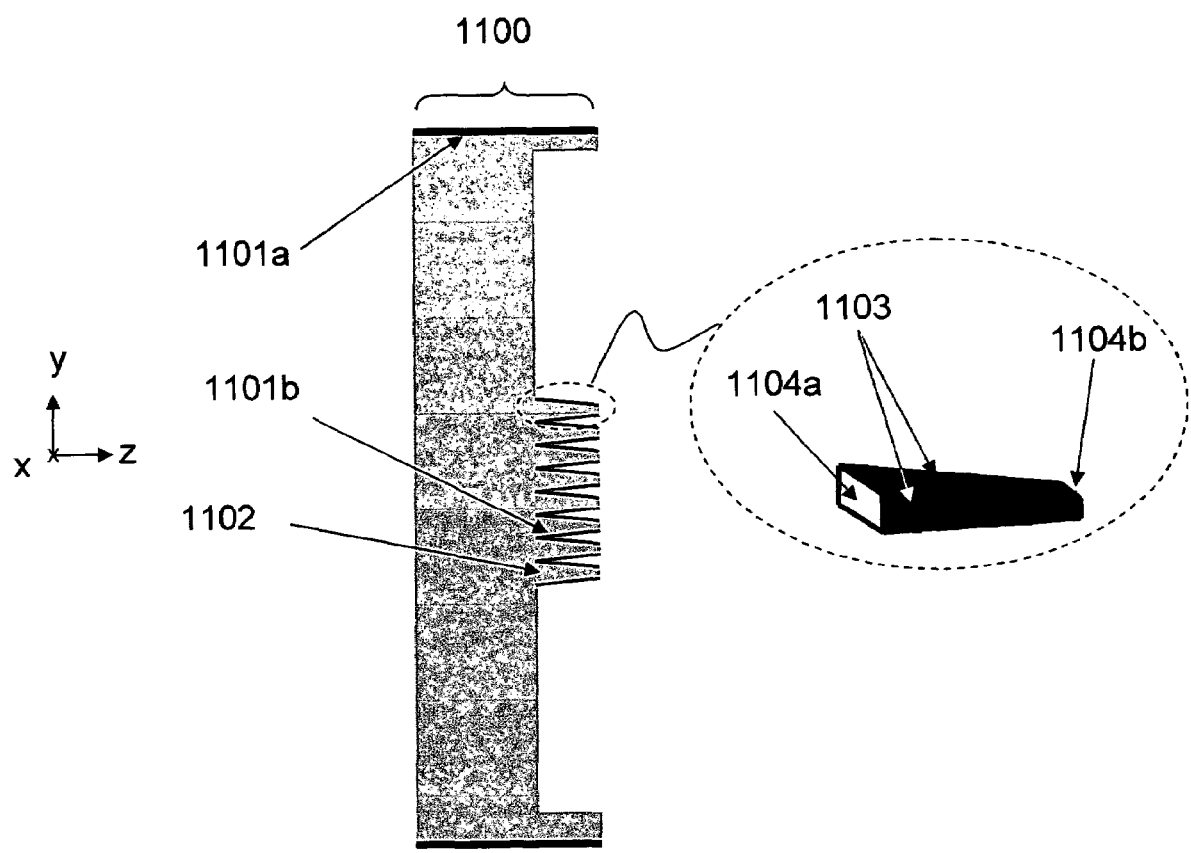
FIG. 4B shows a cross-sectional view of the circulation array of FIG. 4A.
Figure 4C:
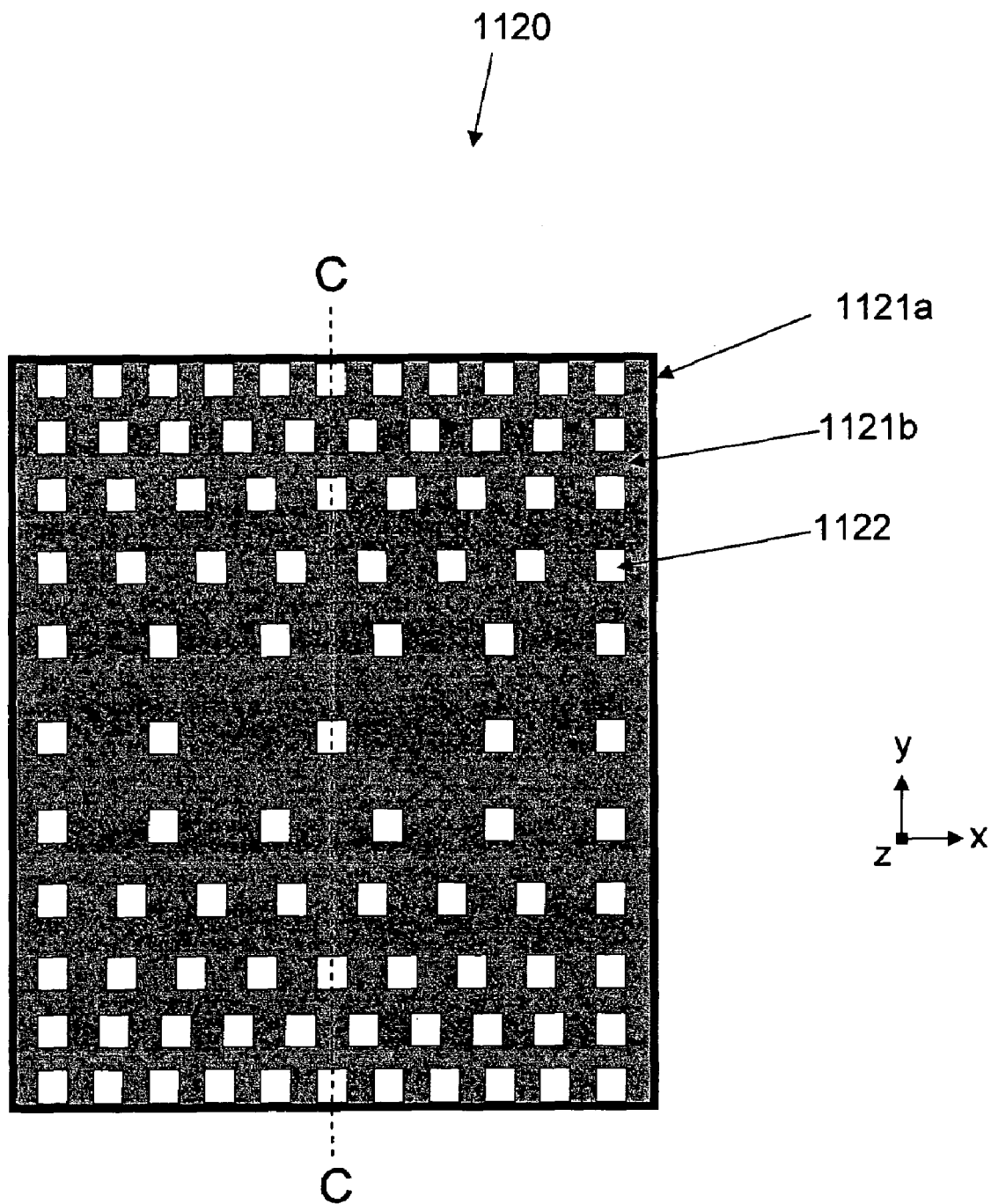
FIG. 4C shows a back plan view of an extraction array with circulation micro-elements on its back side.
Figure 4D:
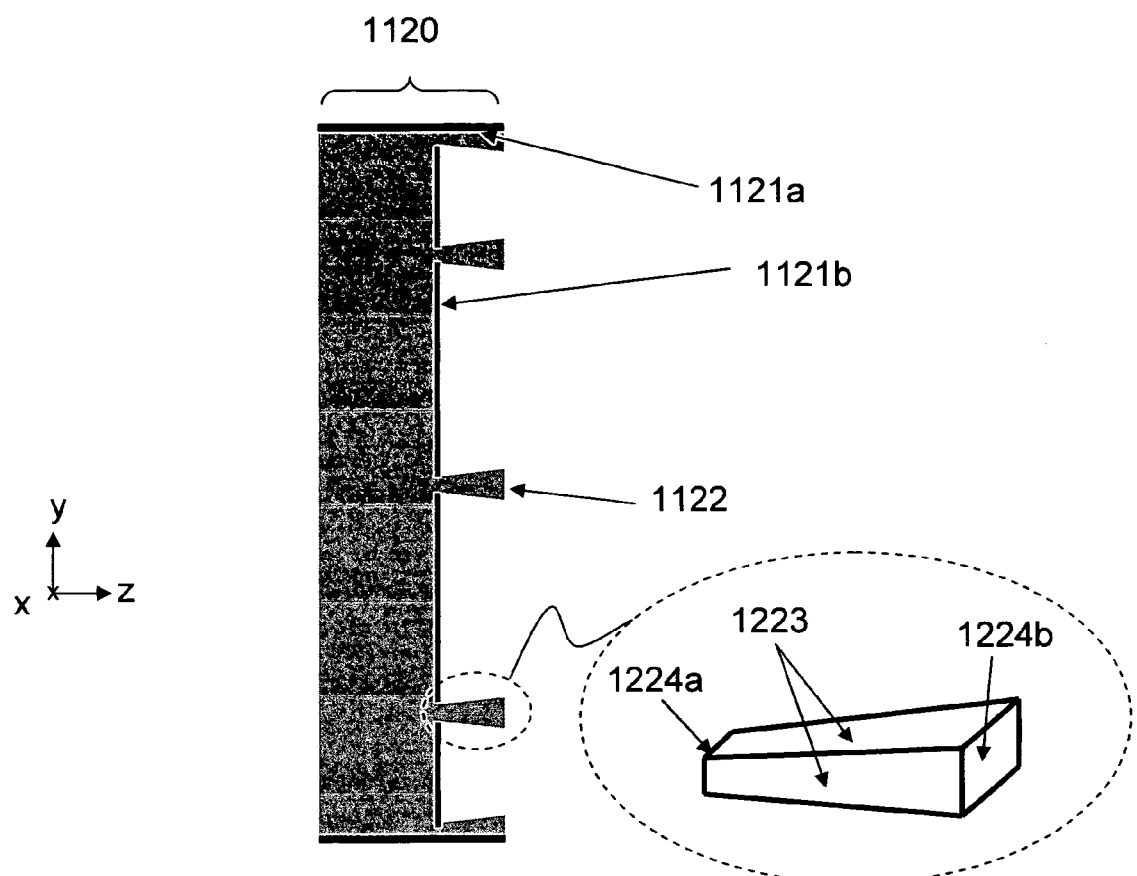
FIG. 4D shows a cross-sectional view of extraction array of FIG. 4C.
Figure 4E:
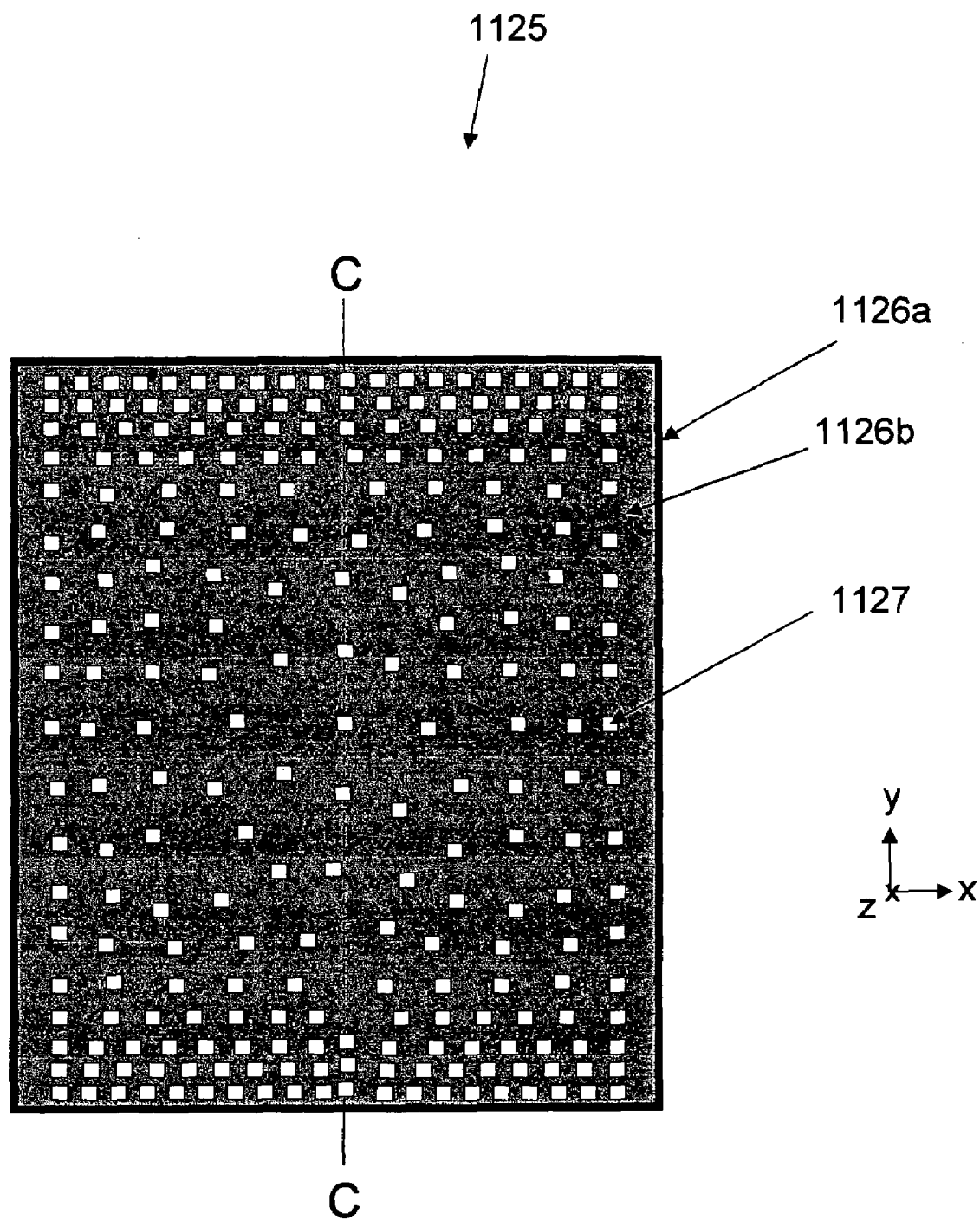
FIG. 4E shows a front plan view of an extraction array with circulation micro-elements on its front side.
Figure 4F:
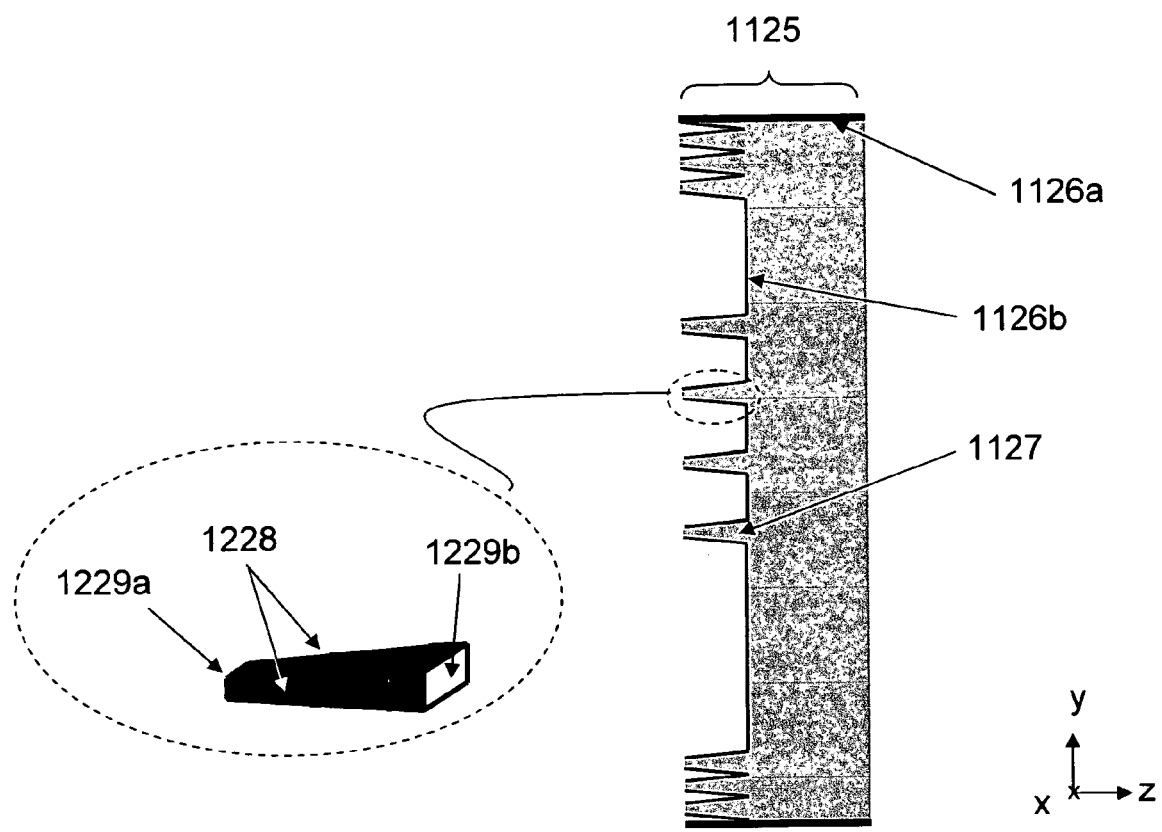
FIG. 4F shows a cross-sectional view of extraction array of FIG. 4E.
Figure 4G:
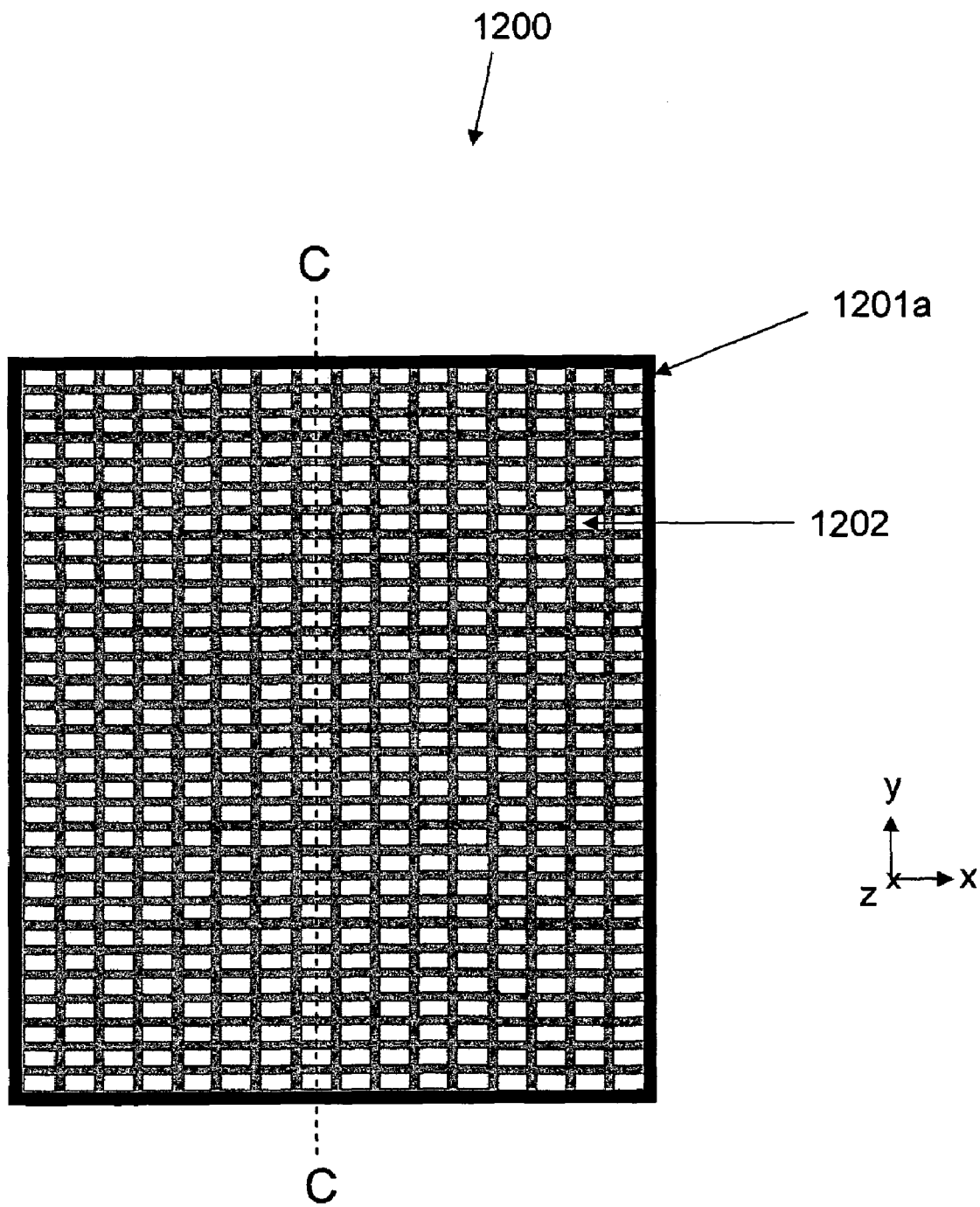
FIG. 4G shows a front plan view of a collimation array using micro-prisms.

FIGS. 4A-4L show more compact and more efficient recyclers 1130 and 1160 when compared to the recycler 34 of FIG. 2C. Recyclers 1130 and 1160 perform the function of recycler 34 with the added advantage of being more compact. FIG. 4A shows a plan view of a two-dimensional optical element array 1100, which consists of circulation micro-elements 1102 arranged in two dimensions (x and y). FIG. 4B shows a cross-sectional view of optical element array 1100 along line C of FIG. 4A with an exploded three-dimensional view of micro-element 1102. Each micro-element has four sidewalls 1103 as well as entrance 1104a and exit 1104b apertures. Reflective layer 1101a is bonded to or deposited on the four sidewalls of array 1100 while sidewalls of circulation micro-elements 1102 are coated with a reflective layer 1101b. FIGS. 4C and 4E show plan views of two-dimensional optical element arrays 1120 and 1125, which consist of extraction micro-elements 1122 and 1127 arranged in two dimensions (x and y). FIGS. 4D and 4F show cross-sectional views of optical element arrays 1120 and 1125 along line C of FIGS. 4C and 4E. Exploded three-dimensional views of micro-element 1122 and 1127 are shown with their corresponding sidewalls 1123 and 1128 as well as entrance 1124a and 1129a and exit 1124b and 1129b apertures. Reflective layers 1121a and 1126a are bonded to or deposited on the four sidewalls of array 1120 and 1125. In addition, reflective layers 1121b and 1126b are deposited on areas between extraction micro-elements 1122 and 1127 as well as on sidewalls of extraction micro-elements 1127. FIG. 4G shows a plan view of micro-prisms 1202 arranged in a two-dimensional micro-prism array 1200. Reflective layer 1201a is bonded to or deposited on the four sidewalls of array 1200.

Figure 4H:
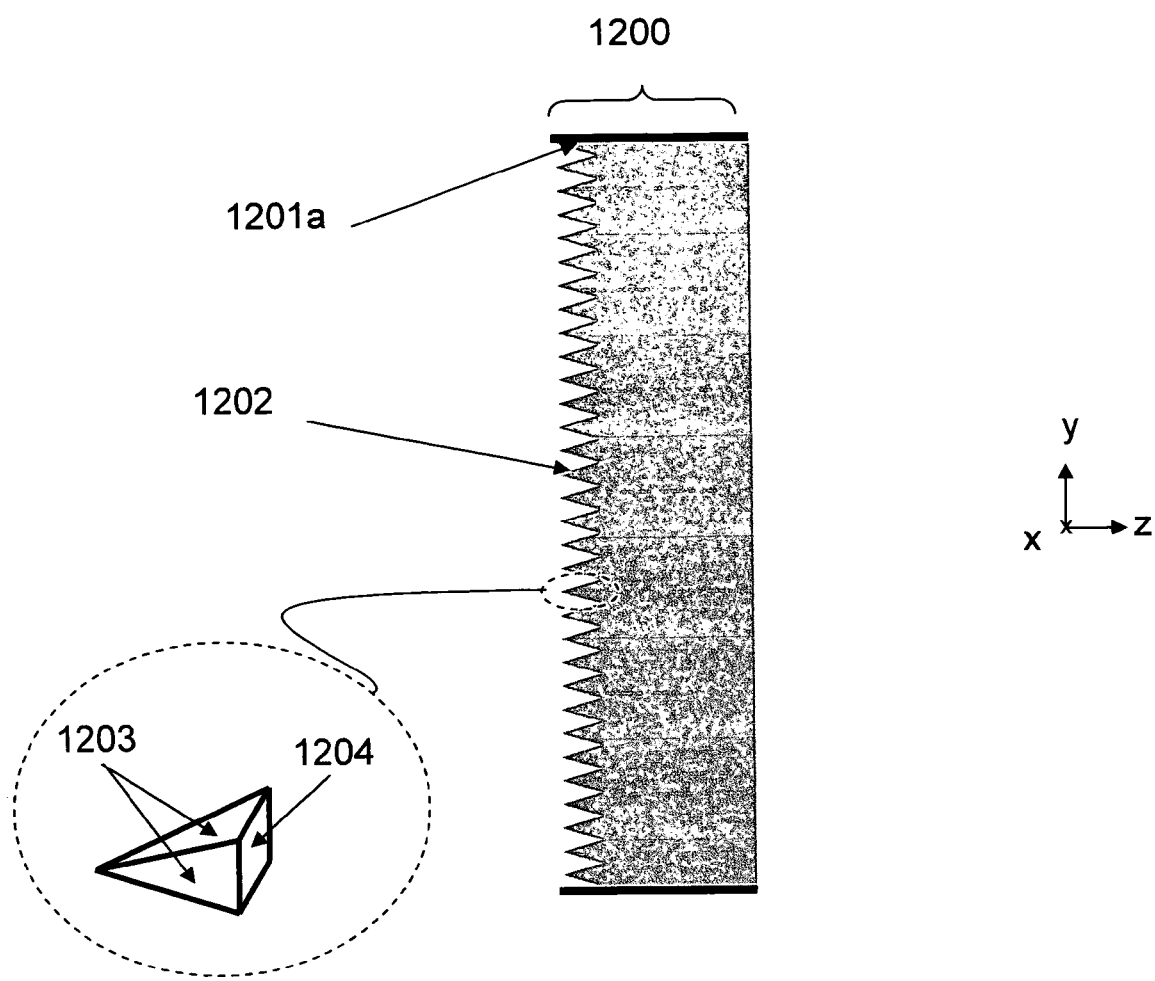
FIG. 4H shows a cross-sectional view of collimation array of FIG. 4G.

FIG. 4H shows a cross-sectional view of micro-prism array 1200 along line C of FIG. 4G with an exploded three-dimensional view of micro-element 1202. As shown in FIG. 4H, each micro-prism 1202 has four sidewalls 1203 (two sidewalls are shown in the perspective view of the exploded micro-prism) as well as entrance 1203 and exit 1204 apertures. Micro-elements 1102, 1122, 1127, and 1202 of arrays 1100, 1120, 1125 and 1200 can have any desired size and shape such as square, rectangular, circular, hexagonal and irregular.

Figure 4I:
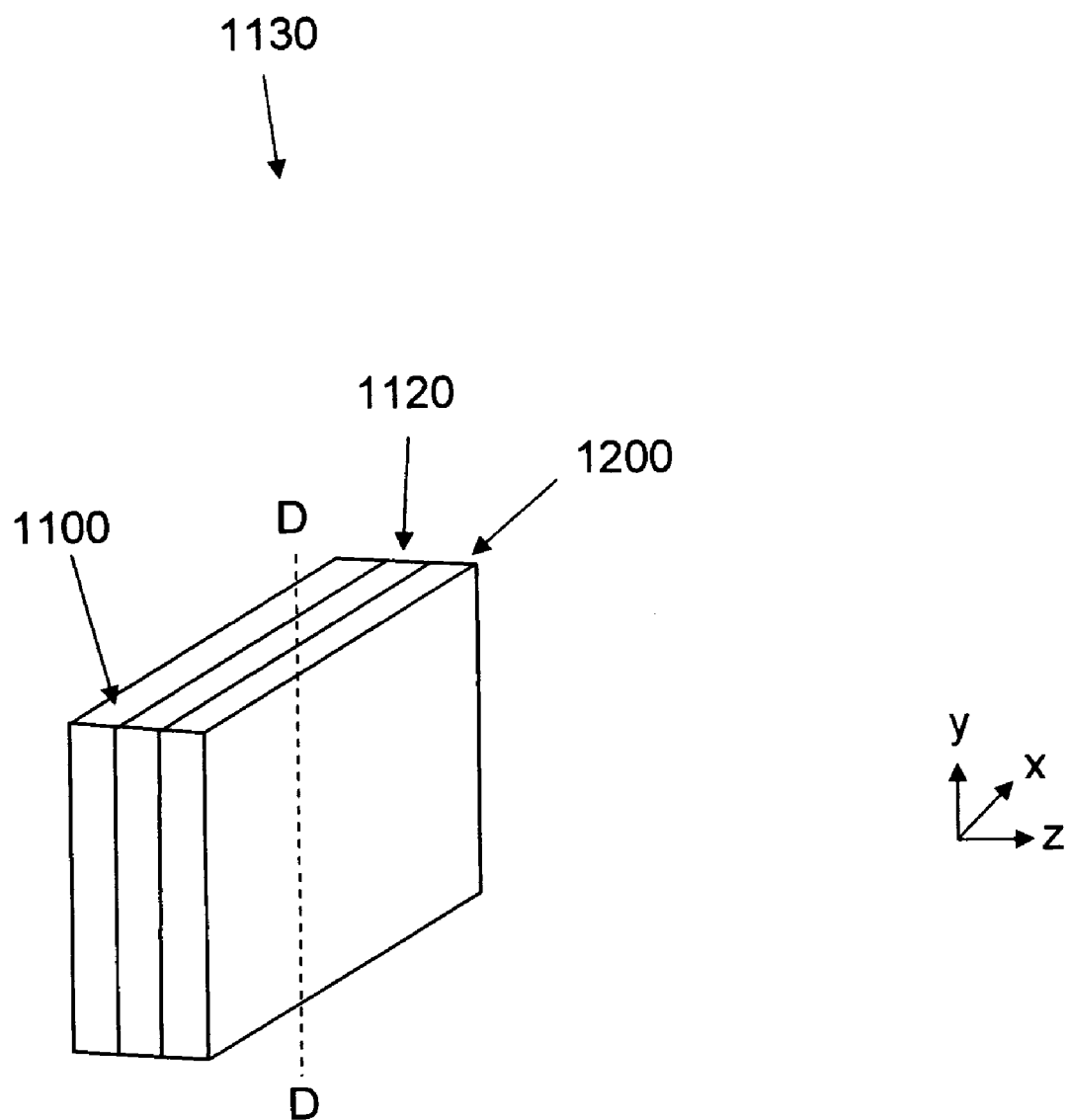
FIG. 4I shows a perspective view of a compact recycler with a collimation array, in accordance with another exemplary embodiment of the invention.
Figure 4J:
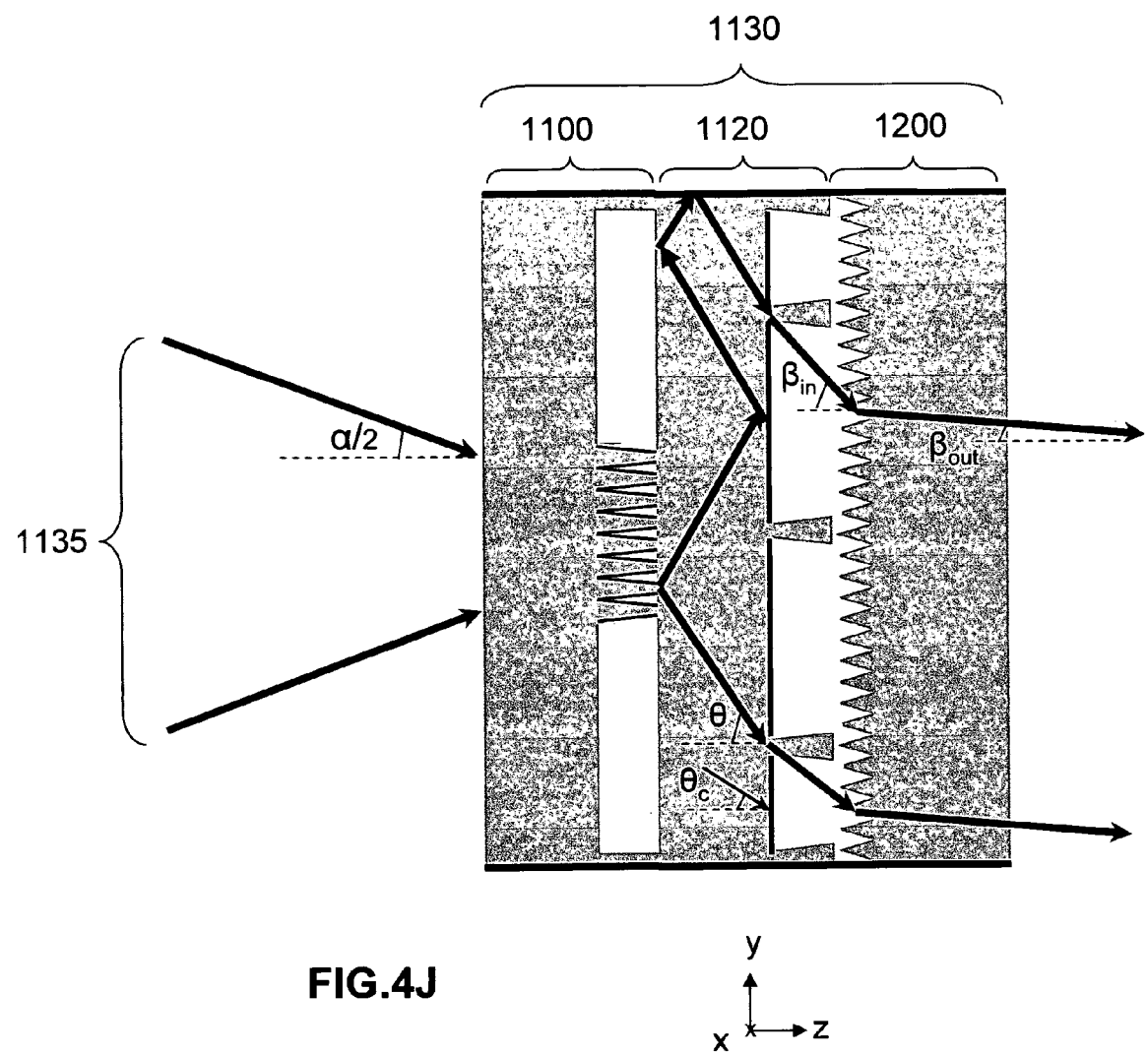
FIG. 4J shows a cross-sectional view of compact recycler of FIG. 4I.
Figure 4K:
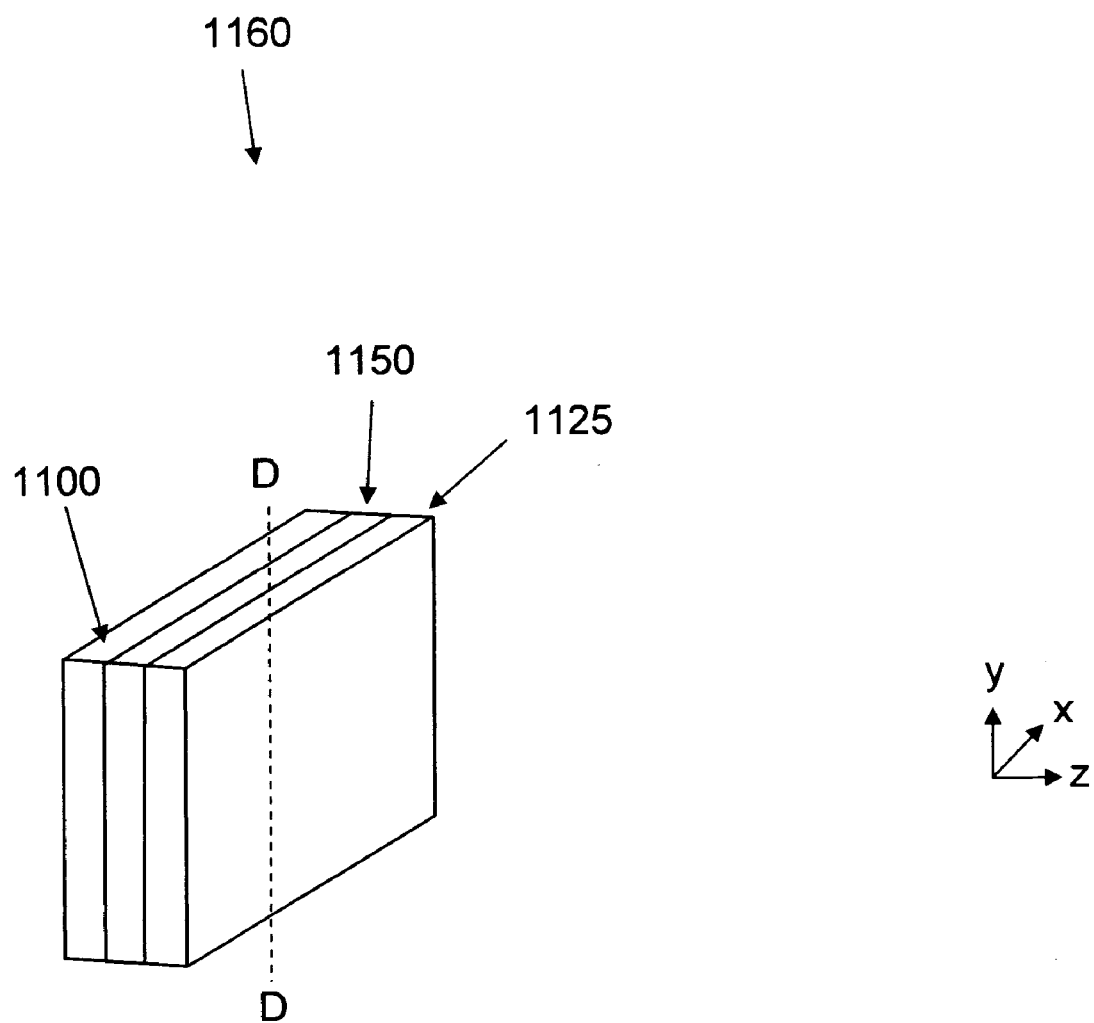
FIG. 4K shows a perspective view of a compact recycler without a collimation array, in accordance with another exemplary embodiment of the invention.
Figure 4L:
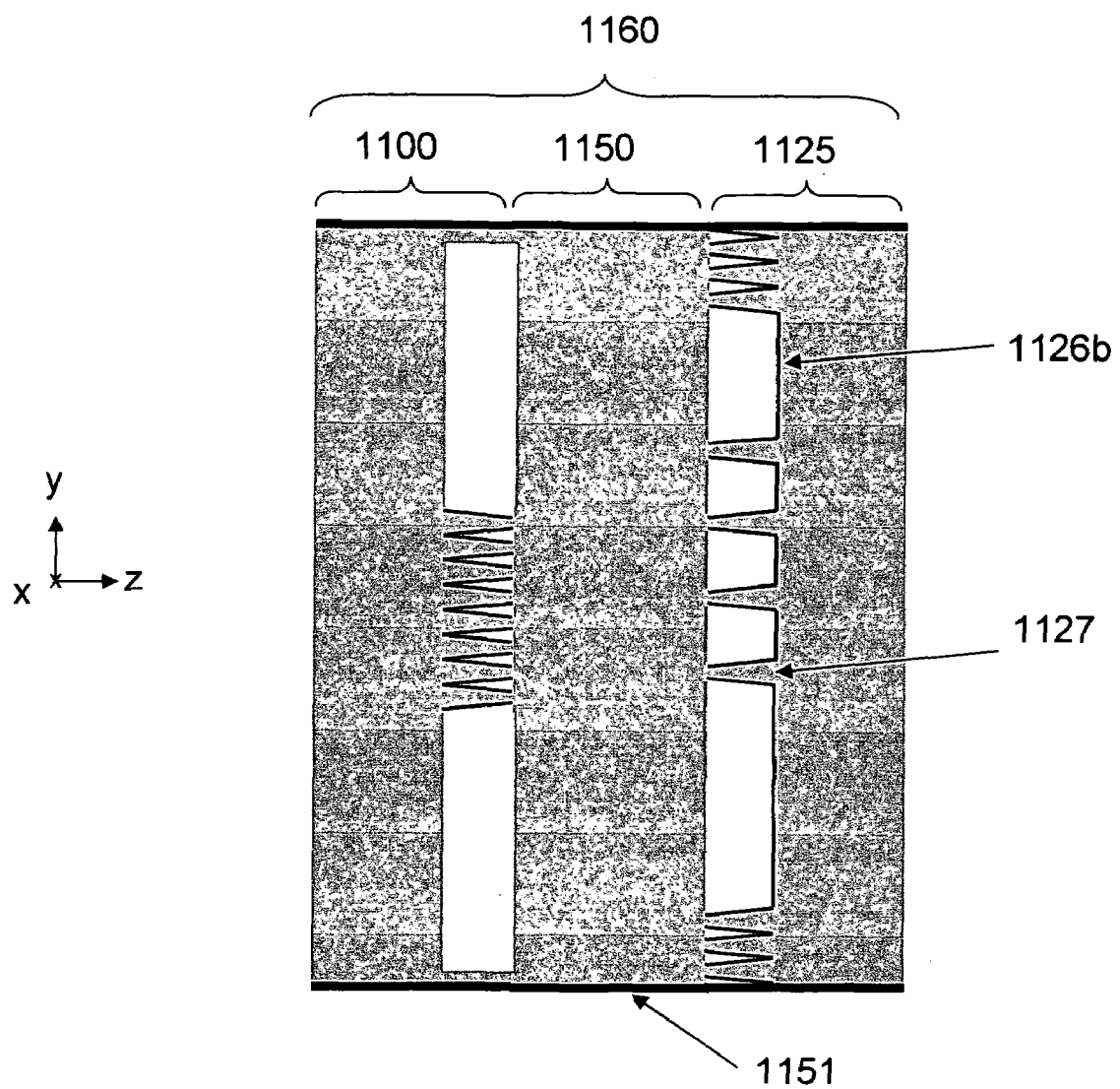
FIG. 4L shows a cross-sectional view of compact recycler of FIG. 4K.

FIGS. 4I and 4K show perspective views of two recyclers 1130 and 1160 according to two embodiments, respectively. FIGS. 4J and 4L show the corresponding cross-sectional views of recyclers 1130 and 1160 along line D of FIGS. 4I and 4K. Recycler 1130 consists of circulation optical element array 1100, extraction optical element array 1120 and micro-prism array 1200, which are attached or bonded together as shown in FIGS. 4I-4J. As shown in FIGS. 4K-4L, recycler 1160 consists of circulation optical element array 1100, plain glass plate 1150 with reflective layer on its four sidewalls and extraction optical element array 1125, which are attached or bonded together.

The operation of recycler 1130 and 1160 is based on circulating the input light within the body of an optical element array 1120 or glass plate 1150 using circulating optical element array 1100. The circulated light is uniformly extracted out of the body of the optical element 1120 or glass plate 1150 using extraction micro-elements 1122 and 1127. As shown in FIG. 4J, the input light 1135 is focused onto the center of optical element array 1100 perpendicularly with a cone angle of α and impinges on the circulation micro-elements 1102 within the circulation array 1100 which increases the cone angle of preferably a substantial part of input light so that it is guided within the body of optical element array 1120 via total internal reflection (TIR) and reflection unless it is extracted by micro-elements 1122. In other words, the function of circulation array 1100 is to deliver light to array 1120 with an angle $\theta > \theta_c$. Extraction micro-elements 1122 are distributed non-uniformly and may be randomly within extraction array 1120 so that their density is inversely proportional to the light density within the body of the optical element 1120. FIGS. 4C and 4E show that the density of extraction micro-elements 1122 and 1127 increase from array 1120 and 1125 center toward its edges. As a result, the light delivered by extraction array 1120 and 1125 is highly uniform. Light extracted by micro-elements 1122 enters the micro-prism array 1200 with an angle $\beta_{in}$ and exits with an angle $\beta_{out}$, thus, a collimated and uniform light beam is delivered by recycler 1130. On the other hand, light reflected back by the color wheel (FIGS. 2A-2B) toward recycler 1130 (i.e. light travels in the −Z direction) enters the micro-prism array 1200 and most of it gets refracted or reflected back toward the color wheel by the micro-prisms 1202 and/or reflective layer 1121b, respectively. The remainder enters extraction optical elements 1122 toward the body of extraction array 1120 where it circulates until it gets extracted then directed toward the color wheel.

In recycler 1160 of FIGS. 4K-4L, the input light is focused onto the center of optical element array 1100, which in turn increases the angle of this light and delivers it to the body of glass plate 1150. The function of array 1100 is the same in both recyclers 1130 and 1160. The light travels within glass plate 1150 via total internal reflection (TIR) and reflection off of reflective sidewalls of glass plate unless it is extracted by micro-elements 1127 within extraction array 1125. Extraction array 1125 is designed as described above to uniformly extract light from the glass plate 1150. In recycler 1160, light gets collimated within the tapered optical elements 1127. In addition, it is possible to use a collimating optical element array or micro-prism array after array 1125 to provide more collimation to the color wheel (FIGS. 2A-2B). Light reflected back by the color wheel toward recycler 1160 enters the optical element array 1125 and most of it gets reflected back toward the color wheel by the reflective layer 1126b and the remainder enters the glass plate 1150 where it circulates then gets extracted and directed toward the color wheel.

Therefore, recyclers 1130 and 1160 provide more efficient recycling of light (reflected by the color wheel) since eventually all the light reflected by the color wheel gets redirected toward the color wheel. This means 100% theoretical recycling efficiency in comparison to 60% theoretical recycling efficiency of known recyclers. In addition, such recyclers 1130 and 1160 provide control over the spatial distribution of light in terms of intensity and cone angle.

Design parameters of each micro-element 1102, 1122, 1127, and 1202 within an array 1100, 1120, 1125 and 1200 include shape and size of entrance and exit apertures, depth, sidewalls shape and taper, and orientation. Micro-elements 1102, 1122, 1127, and 1202 within an array 1100, 1120, 1125 and 1200 can have uniform, non-uniform, random or non-random distributions and range from thousands to millions with each micro-element 1102, 1122, 1127, and 1202 being distinct in its design parameters. The size of the entrance/exit aperture of each circulation micro-element is preferably $\geq 5$ µm in case of visible light in order to avoid light diffraction phenomenon. However, it is possible to design micro-elements with sizes of entrance/exit aperture being <5 µm. In such case, the design should consider the diffraction phenomenon and behavior of light at such scales to provide homogeneous light distributions in terms of intensity, viewing angle and color over a certain area. Micro-elements 1102, 1122, 1127, and 1202 can be arranged as a one-dimensional array, two-dimensional array, circular arrays and can be aligned or oriented individually.

Figure 5A:
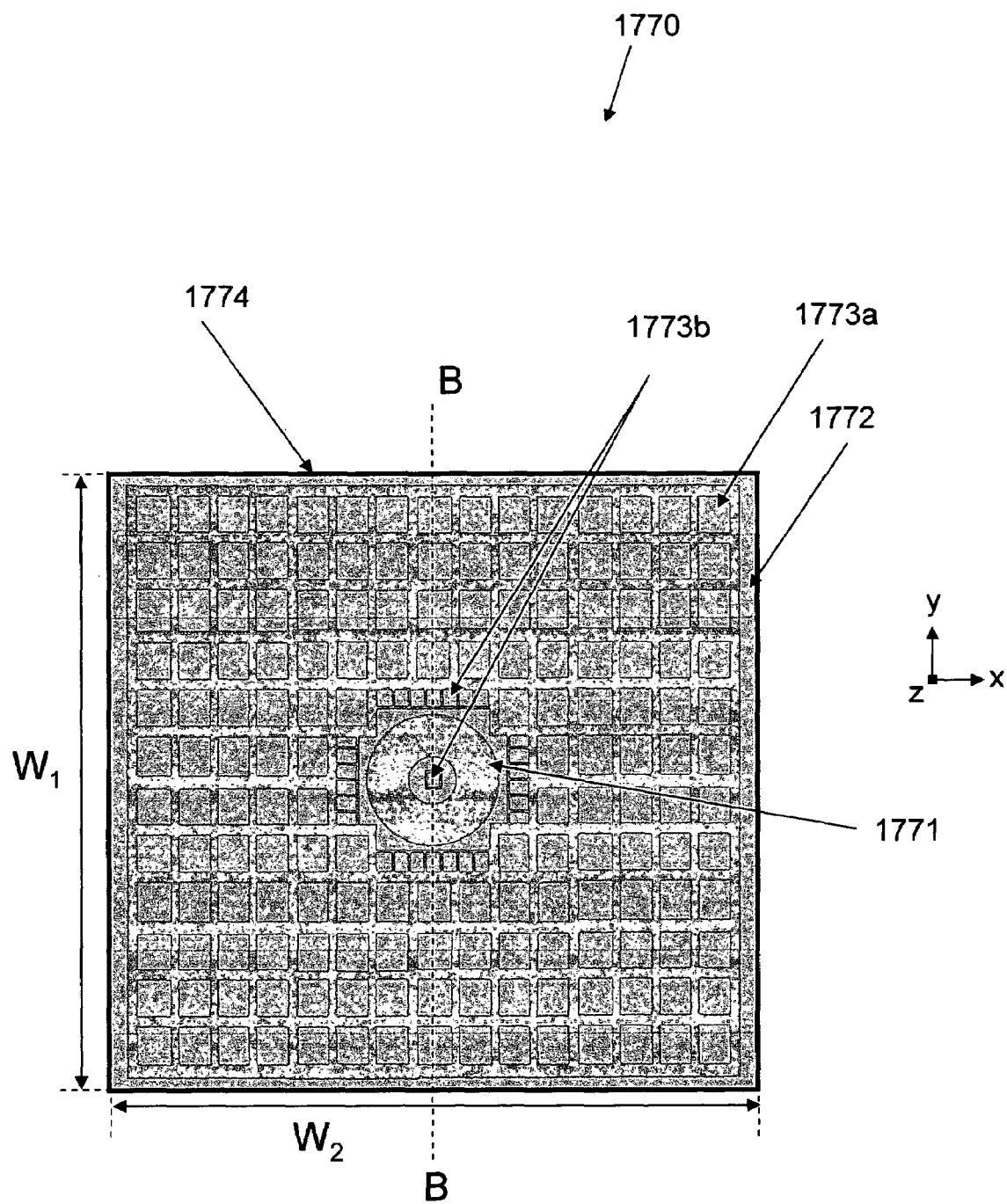
FIG. 5A shows a front plan view of a recycler consisting of a single array, in accordance with another exemplary embodiment of the present invention.
Figure 5B:
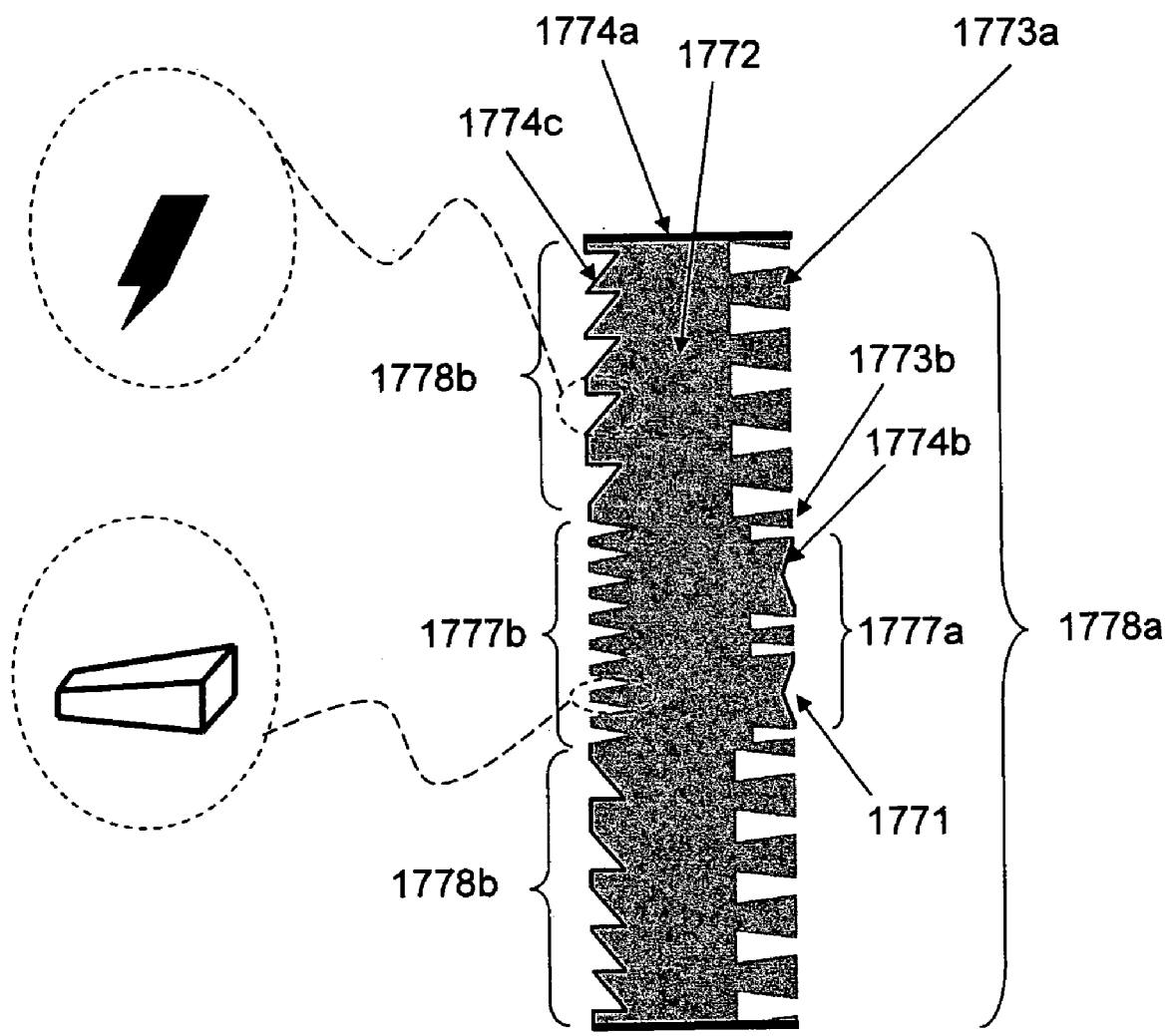
FIG. 5B shows a cross-sectional view of an exemplary structure of the recycler of FIG. 5A.

According to another embodiment of the invention, FIGS. 5A-5B show a recycler 1770 consisting of circulation 1777*a* and extraction 1778*a* and 1778*b* optical element arrays fabricated on a single optically transmissive substrate 1772. FIGS. 5A and 5B show front plan view and cross-sectional view of a recycler 1770 of FIG. 5A along line B. Circulation array 1777*a* and extraction array 1778*a* are fabricated on the back side of substrate 1772. Extraction array 1778*a* consists of extraction micro-elements 1773*a* and 1773*b* which overlap with circulation micro-elements 1774*b*. On the front side of substrate 1772, there are extraction array 1778*b* and an optional collimating array 1777*b*. Collimating array 1777*b* can be eliminated or replaced by an optical element array of another type. Extraction array 1778*b* consists of one dimensional prisms, which extend in the x-direction and are coated with a reflective layer 1774*c* and collimate light impinging on them so that it exits the array 1770 surface perpendicularly (i.e. substantially parallel to the Z-axis). Extraction micro-elements within array 1778*b* may have other shapes such as micro-prisms or micro-lenses that are distributed in a two dimensional array. Micro-elements within extraction arrays 1778*a* and 1778*b* are distributed over the surface of the substrate 1772 so that light is extracted uniformly from the body of the substrate 1772. It is possible to have a recycler 1770 with only one extraction array 1778*a* or 1778*b* rather than two arrays 1778*a* and 1778*b*. For simplicity of illustration, the circulation array 1777*a* is shown to have one circulating micro-element 1771 as shown in FIG. 5A. Number, size and shape of circulating micro-element 1771 are some of the design parameters of circulation array 1777*a*. A reflective layer 1774*a* is bonded or deposited on the four edges of substrate 1772. The operation of collimating 1777*b*, circulation 1777*a* and extraction 1778*a* and 1778*b* optical element arrays is no different from the operation of the already discussed collimating, circulation and extraction arrays. Thus, recycler 1770 and recyclers 1130 and 1160 operate in a similar manner. The advantage of recycler 1770 over recyclers 1130 and 1160 is its high compactness.

Figure 6A:
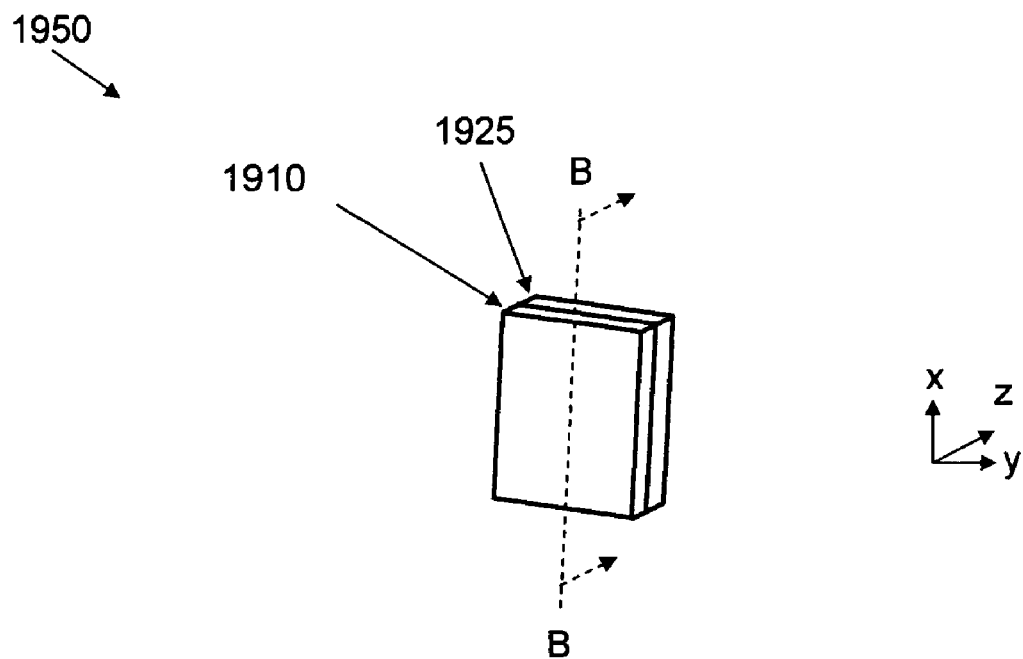
FIG. 6A shows a perspective view of a compact recycler in accordance with another exemplary embodiment of the present invention.
Figure 6B:
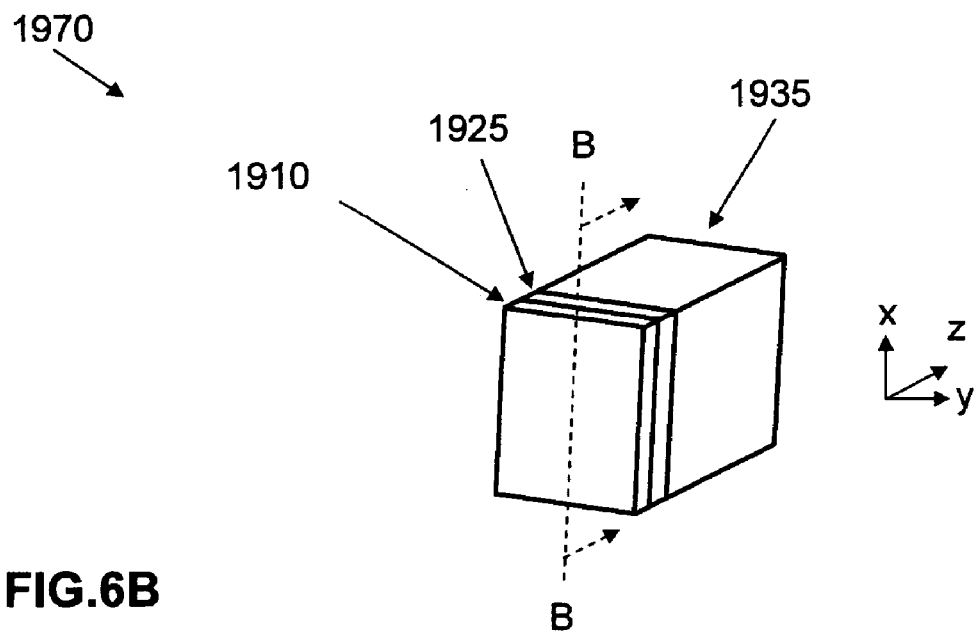
FIG. 6B shows a perspective view of a compact recycler with a light guide, in accordance with further exemplary embodiment of the present invention.
Figure 6C:
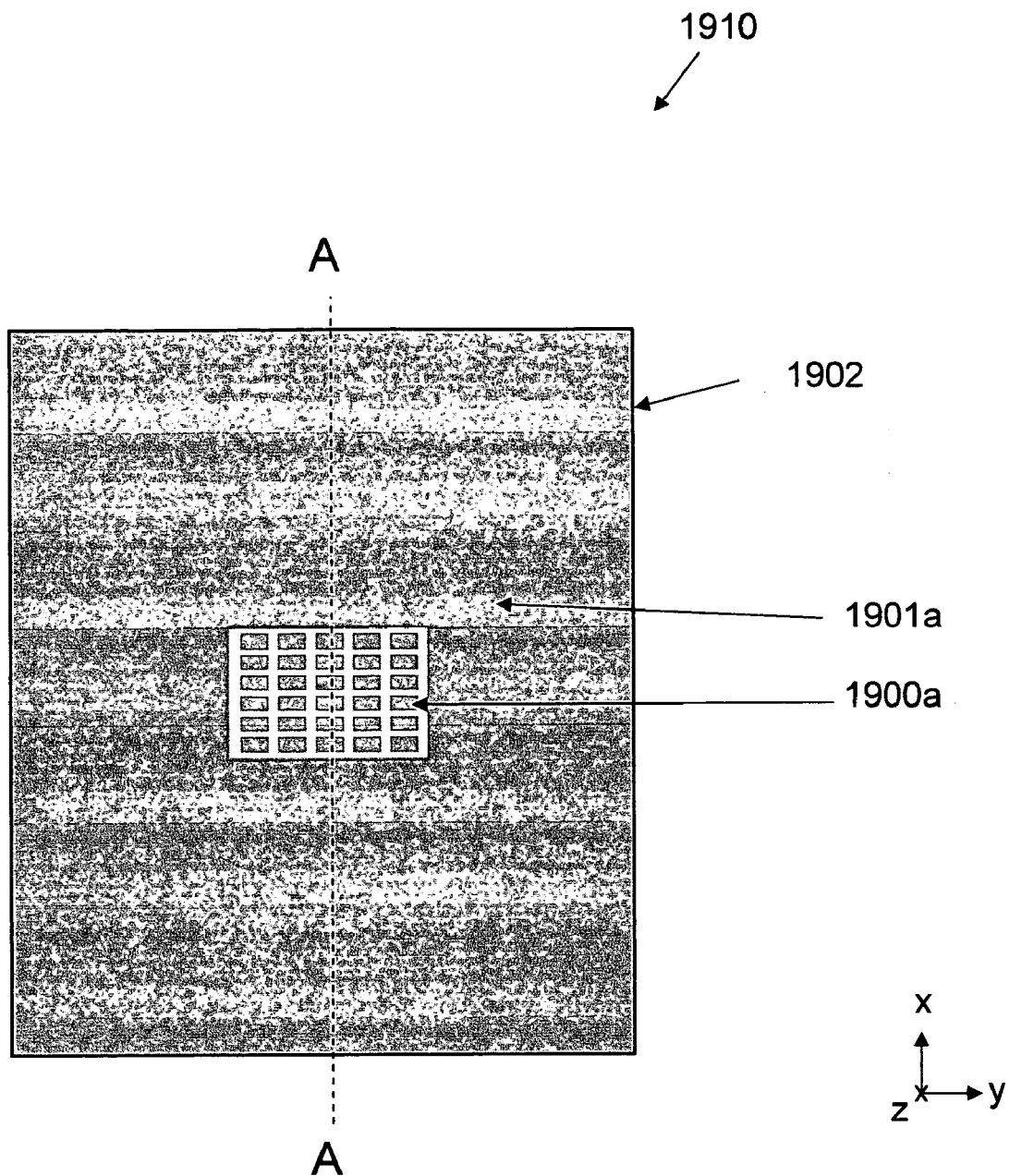
FIG. 6C shows a front plan view of the first array of FIGS. 6A-6B.
Figure 6D:
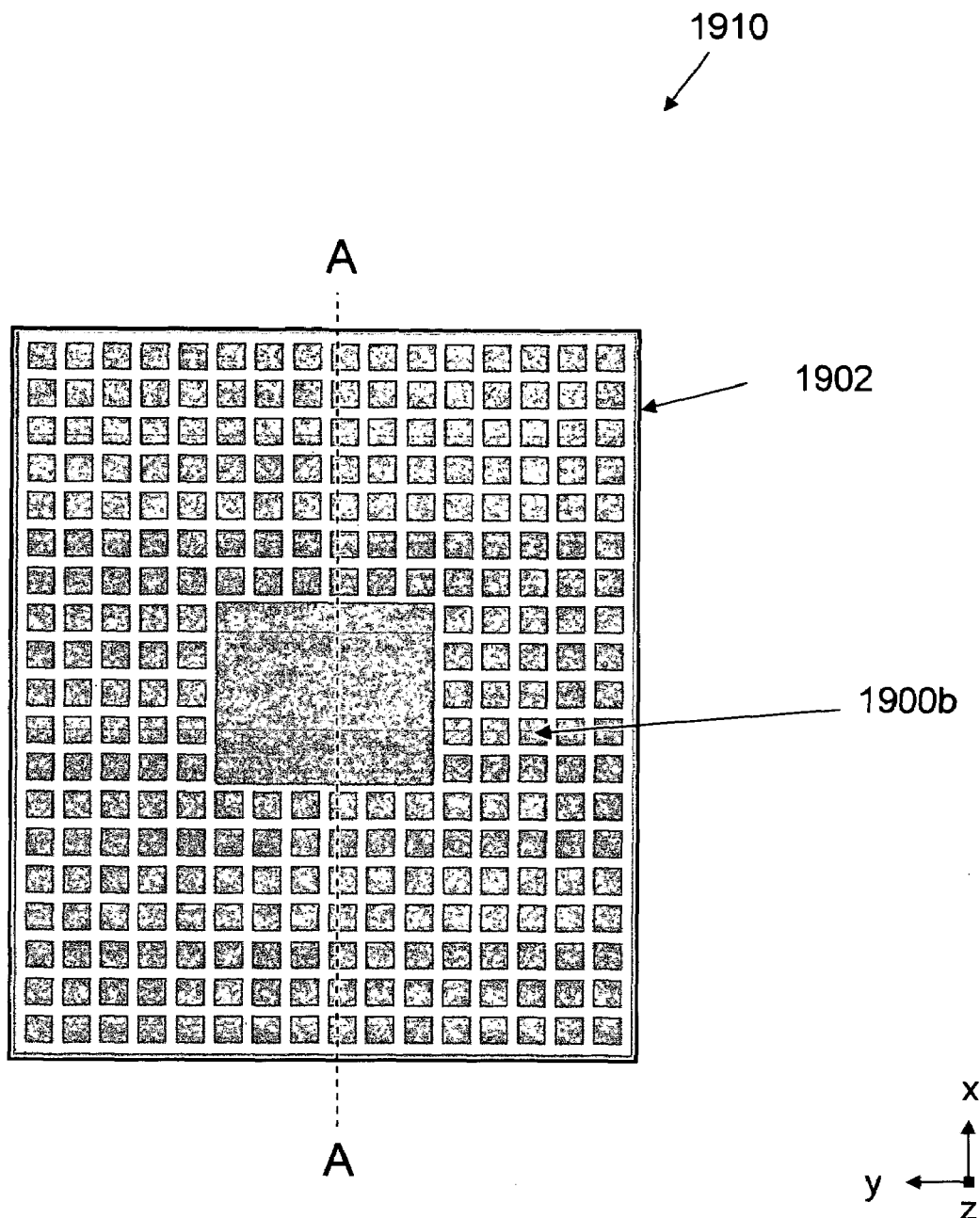
FIG. 6D shows a back plan view of the first array of FIGS. 6A-6B.
Figure 6E:
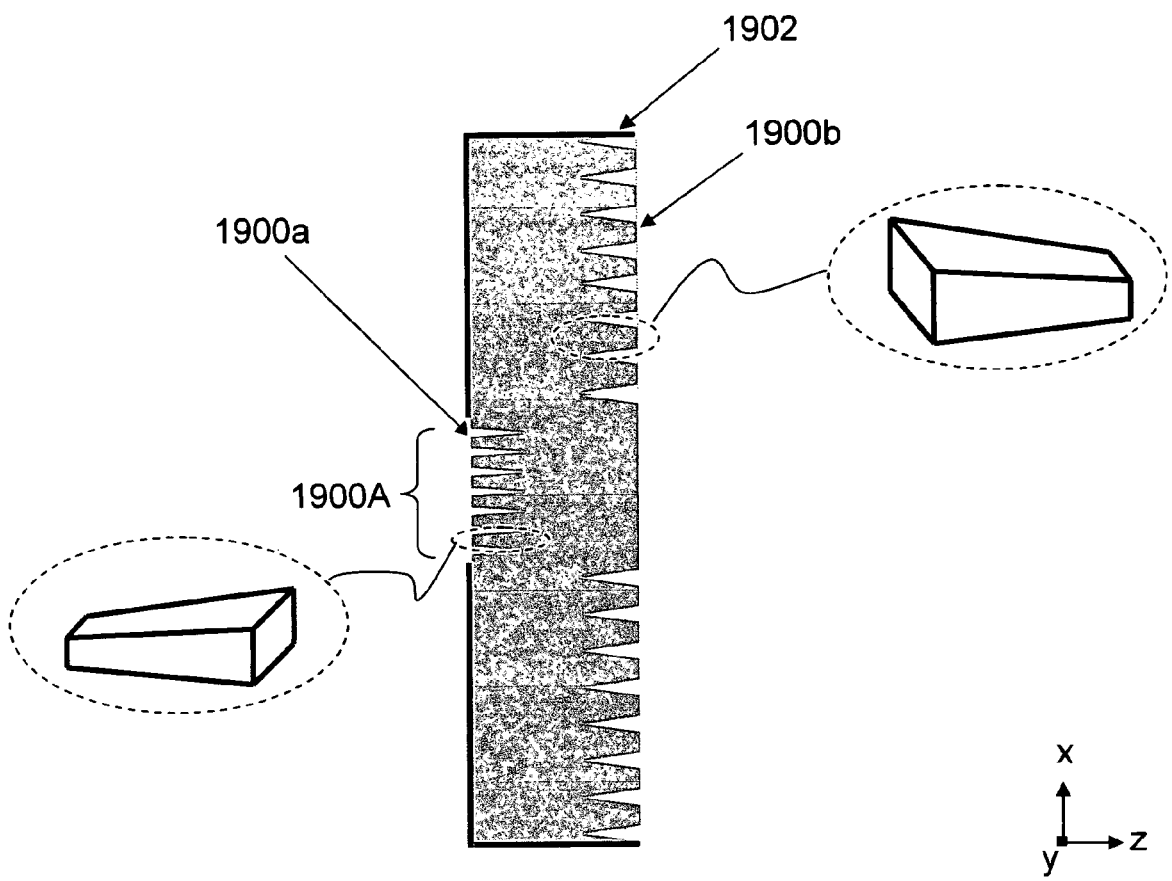
FIG. 6E shows a cross-sectional view of the array of FIGS. 6A-6B.

FIGS. 6A-6B show perspective views of two recyclers 1950 and 1970 according to two embodiments of the invention. Recycler 1950 uses two optical element arrays 1910 and 1925 in its structure, whereas, recycler 1970 uses in addition to that a light pipe/tunnel 1935. FIGS. 6C and 6D show a top and bottom views of optical element array 1910 and FIG. 6E shows a cross-sectional view of FIGS. 6C-6D along line A. A collimating optical element array 1900A is shown on the front surface of optical element array 1910, which correspond to the location of the hot spot of the input light beam. On the back side of array 1910, there are extraction optical elements 1900*b* arranged in an array in the xy-plane. Distribution of these extraction optical elements 1900*b* can be uniform (FIG. 6D), non-uniform or random. Non-uniform distribution is preferable since it allows uniform extraction of light over the recycler's exit aperture. Exploded perspective views of collimating optical elements 1900*a* and extraction optical elements 1900*b* are shown in FIG. 6E.

Figure 6F:
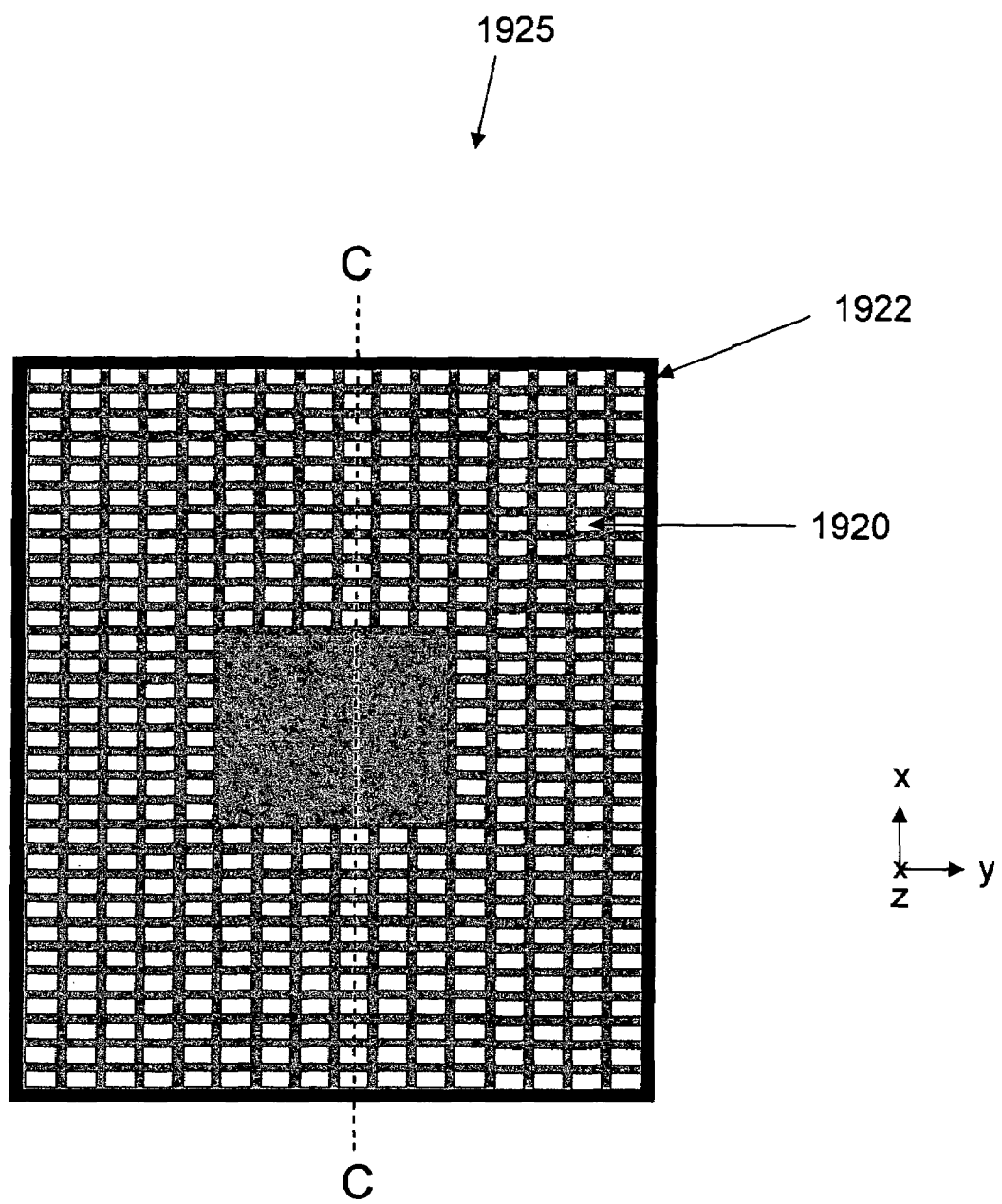
FIG. 6F shows a front plan view of the second array of FIGS. 6A-6B.
Figure 6G:
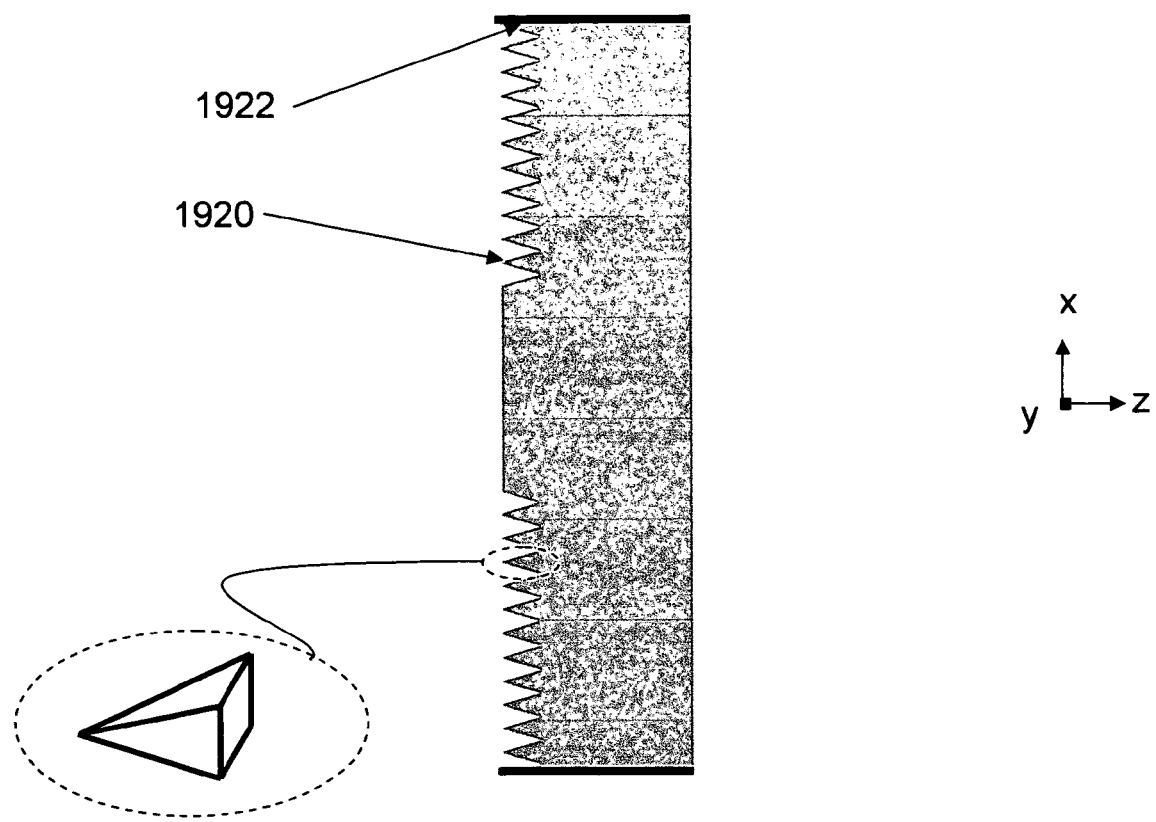
FIG. 6G shows a cross-sectional view of the array of FIG. 6F.
Figure 6H:
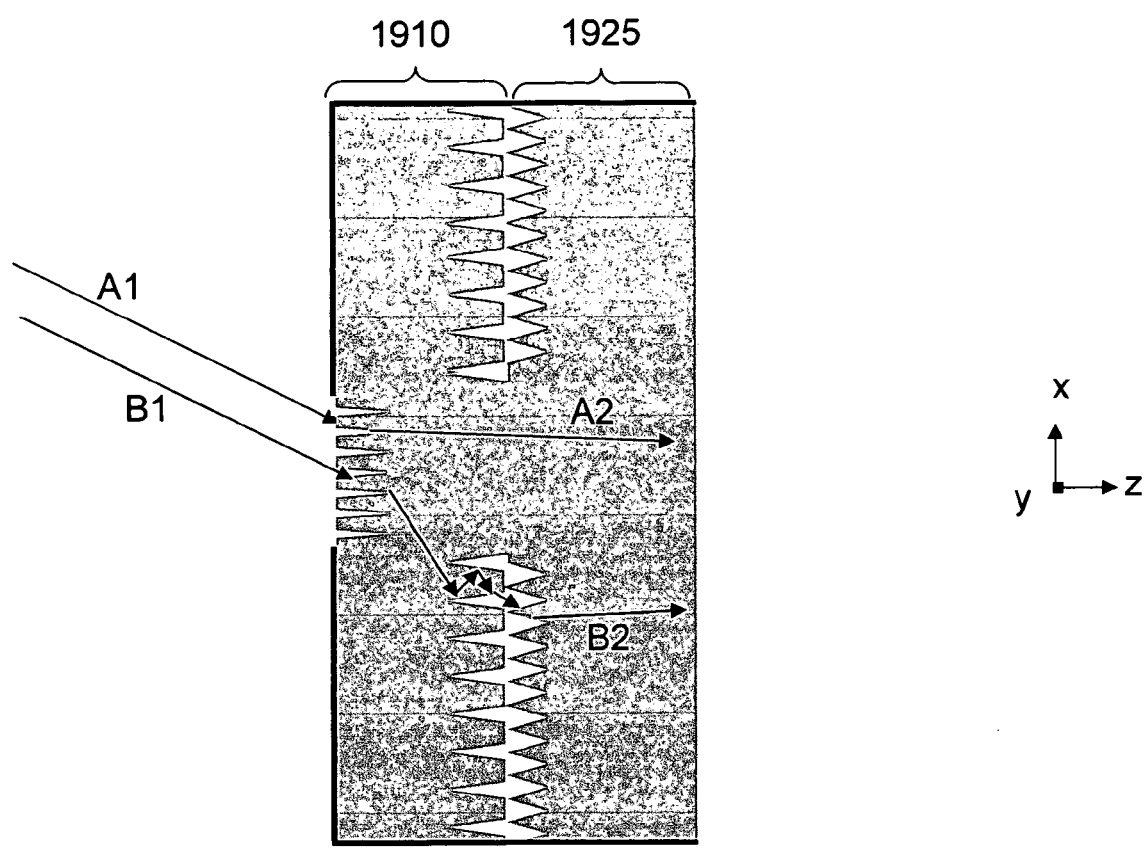
FIG. 6H shows a cross-sectional view of a compact recycler of FIG. 6A.
Figure 6I:
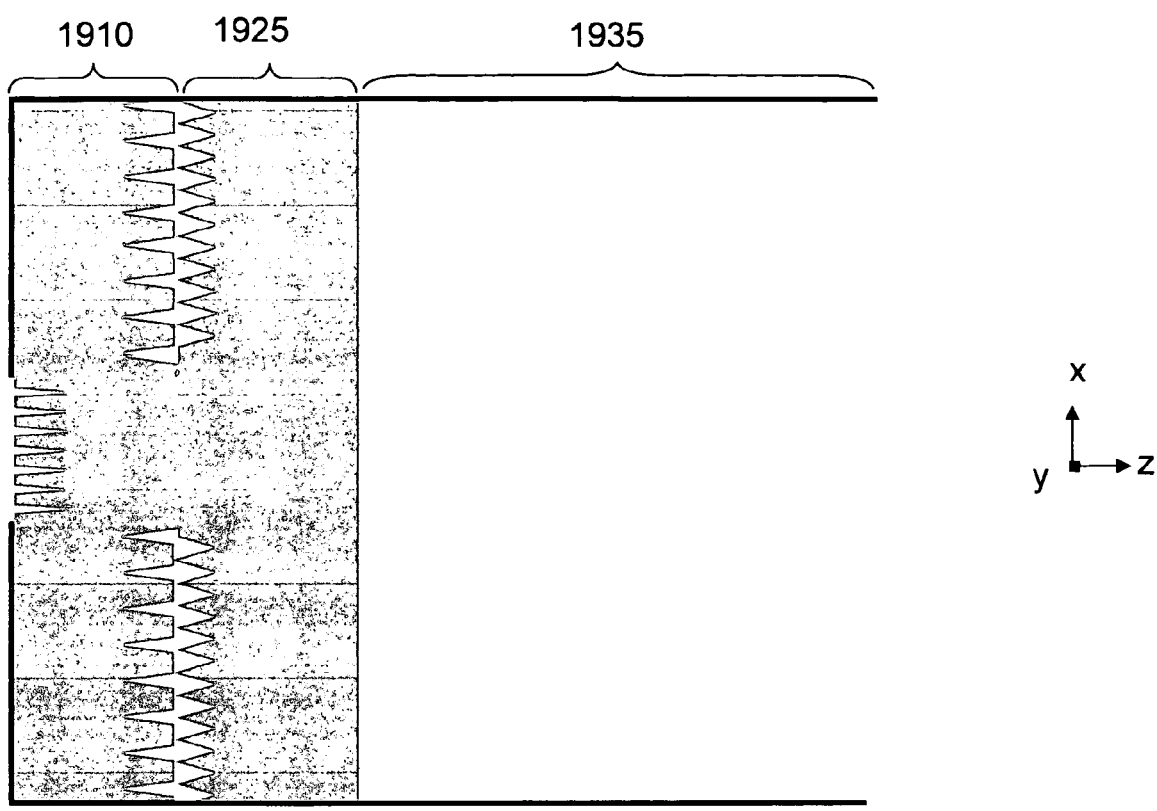
FIG. 6I shows a cross-sectional view of a compact recycler of FIG. 6B.

FIGS. 6F and 6G show a perspective view and cross-sectional view of collimating optical element array 1925 along line C of FIG. 6F. As shown in FIGS. 6F-6G, micro-prisms 1920 are distributed over the surface of array 1925 in areas that do not correspond to the input light (i.e. collimating array 1900A). A perspective view of micro-prisms 1920 is shown in FIG. 6G. Cross-sectional views of recyclers 1950 and 1970 are shown in FIGS. 6H-6I along plane B of FIGS. 6A-6B.

The operation of recyclers 1950 and 1970 is based on collimating part of the input light that passes through the entrance apertures of the collimating optical elements 1900*a* of array 1900A. The input light that passes through the sidewalls of optical elements 1900*a* is diverged (i.e. cone angle is increased) and gets spatially separated from the collimated light as it reaches the extraction optical elements 1900*b*. For simplicity of illustration, rays A1 and A2 represent the input light that goes through the entrance apertures of the collimating optical elements 1900*a* and rays B1 and B2 represent the input light that goes through their sidewalls as shown in FIG. 6H. Light extracted (i.e. diverged light) from the body of array 1910 is collimated by micro-prism array 1925 while light collimated by array 1900A travels through plates 1910 and 1925 without encountering any micro-elements. Light exiting plate 1925 enters light pipe/tunnel 1935 for further homogenization then to next stage (FIG. 6I) or is delivered directly to the next stage (FIG. 6H). Recyclers 1950 and 1970 have the advantage over previous embodiments of providing a high level of collimation using a simpler fabrication and assembly process.

The specific shapes, sizes and arrangements of the optical element arrays described herein are only a small subset of the possible optical element arrays that can be used within the scope and spirit of the invention. Some of the other array types that are usable with the systems disclosed herein are described in the U.S. Patent Applications identified in the immediately following paragraph.

Techniques for manufacturing the optical element arrays disclosed herein are described in U.S. patent application Ser. No. 10/458,390, titled "Light Guide Array, Fabrication Methods and Optical System Employing Same" and U.S. patent application Ser. No. 11/066,605, titled "Compact Projection System Including A Light Guide Array", filed on Feb. 25, 2005, both of which are incorporated herein by reference.

While various embodiments of the invention have been described, it will be apparent to those of ordinary skill in the art that more embodiments and implementations, other than those specifically described above, are possible that are within the scope of this invention. Further, the foregoing summary, detailed description, drawings and embodiments described above are considered as illustrative only of the principles of the invention and are not intended to limit the scope of the invention. Since other modifications and changes may be or become apparent to those skilled in the art, the invention is thus not limited the exact embodiments shown and described above, and accordingly, all suitable modifications and equivalents are deemed to fall within the scope of the invention, as it is defined by the claims below.

What is claimed is:

1. A light recycler for use in a color projection system, comprising:
    a reflective plate having at least one aperture formed therein to pass light from a light source, the reflective plate being configured to reflect light reflected from a color wheel included in the color projection system; and
    a substantially planar optical element array located at the aperture and configured to receive light passing through the aperture, the optical element array including an optically transmissive substrate and a plurality of optical micro-elements formed in the substrate.

2. The light recycler of claim 1, wherein the optical element array splits the input light from the light source into a plurality of superimposing sub-beams to produce a substantially uniform distribution of output light across the exit aperture of the light recycler.

3. The light recycler of claim 1, wherein the optical micro-elements are selected from the group consisting of lenses, prisms, tunnels, optical waveguides, and any suitable combination of the foregoing.

4. The light recycler of claim 1, wherein the micro-elements are separated from each another by air or a material having a lower refractive index than the micro-elements.

5. The light recycler of claim 1, further comprising a light pipe aligned along the same optical axis with the optical element array.

6. The light recycler of claim 1, wherein the optical element array is included in the reflective plate.

7. A light recycler for use in a color projection system, comprising:
    a substantially planar two-dimensional circulation optical element array having a plurality of optical elements formed and positioned in a predetermined arrangement on at least one surface of the circulation optical element array, for circulating input light within the light recycler;
    a substantially planar two-dimensional extraction optical element array having a plurality of optical elements formed and positioned in a predetermined arrangement on at least one surface of the extraction optical element array, for extracting circulating light from the circulation optical element array ; and
    a substantially planar two-dimensional collimation optical element array having a plurality of optical elements formed and positioned in a predetermined arrangement on at least one surface of the collimation optical element array, for collimating the extracted light.

8. The light recycler of claim 7, wherein the collimation optical element array includes a plurality of micro-prisms.

9. The light recycler of claim 7, wherein the circulation optical element array and the extraction optical element array are formed on two substantially parallel surfaces of a single optically transmissive planar substrate.

10. A color projection system, comprising:
    a light source emitting substantially non-uniform light in terms of intensity and angle;
    a light recycler comprising:
        a reflective plate having at least one aperture configured to pass the non-uniform light from the light source, the reflective plate being configured to reflect light reflected from a color wheel included in the color projection system,
        a light guide aligned along the same optical axis with the reflective plate and receiving light passing through the aperture, and
        at least one substantially planar optical element array located at the aperture of the reflective plate and receiving the non-uniform light from the light source, the optical element array including an optically transmissive substrate and a plurality of optical micro-elements formed in the substrate, the light recycler producing an output light beam of predetermined cross-sectional area and predetermine spatial distribution of light intensity and angle;
    means for producing plural color light beams from the light output of the light recycler; and
    at least one modulator for modulating the plural color light beams to produce an output image.

11. The color projection system of claim 10, wherein the producing means includes the color wheel.

12. The color projection system of claim 10, further comprising:
    a lens selected from the group consisting of a focusing lens, a projection lens, and a combination of the foregoing.

13. The color projection system of claim 10, further comprising a screen.

14. The color projection system of claim 10, wherein the light recycler further comprises a second substantially planar optical element array aligned along the same optical axis with the reflective plate and light pipe, receiving light output from the light pipe.

15. The color projection system of claim 10, wherein the light recycler includes:
    a substantially planar two-dimensional circulation optical element array having a plurality of optical elements formed and positioned in a predetermined arrangement on at least one surface of the circulation optical element array, for circulating input light within the light recycler; and
    a substantially planar two-dimensional extraction optical element array having a plurality of optical elements formed and positioned in a predetermined arrangement on at least one surface of the extraction optical element array, for extracting circulating light from the light recycler.

16. The light recycler of claim 15, further comprising:
    a substantially planar two-dimensional collimation optical element array having a plurality of optical elements formed and positioned in a predetermined arrangement on at least one surface of the collimation optical element array, for collimating the extracted light.

17. The light recycler of claim 15, wherein the circulation optical element array and the extraction optical element array are formed on two substantially parallel surfaces of a single optically transmissive planar substrate.

* * * * *